US012687222B2

(12) United States Patent
Stocks et al.

(10) Patent No.: US 12,687,222 B2
(45) Date of Patent: Jul. 21, 2026

(54) CONTROL SYSTEM, SYSTEM AND METHOD FOR AN ELECTRIC VEHICLE

(71) Applicant: Jaguar Land Rover Limited, Whitley (GB)

(72) Inventors: Oliver Stocks, Coventry (GB); Benjamin Stegmann, Freidberg am Neckar (DE); Nilabza Dutta, Coventry (GB); Francesco Garbo, Coventry (GB)

(73) Assignee: Jaguar Land Rover Limited, Whitley (GB)

( * ) Notice: Subject to any disclaimer, the term of this patent is extended or adjusted under 35 U.S.C. 154(b) by 37 days.

(21) Appl. No.: 18/558,111

(22) PCT Filed: Apr. 29, 2022

(86) PCT No.: PCT/EP2022/061460
§ 371 (c)(1),
(2) Date: Oct. 30, 2023

(87) PCT Pub. No.: WO2022/229380
PCT Pub. Date: Nov. 3, 2022

(65) Prior Publication Data

US 2024/0218924 A1     Jul. 4, 2024

(30) Foreign Application Priority Data

Apr. 30, 2021     (GB) ...................................... 2106216

(51) Int. Cl.
F16H 57/04     (2010.01)
B60L 1/00     (2006.01)
B60L 58/27     (2019.01)

(52) U.S. Cl.
CPC .......... F16H 57/0413 (2013.01); B60L 1/003 (2013.01); B60L 58/27 (2019.02); F16H 57/0415 (2013.01); F16H 57/0435 (2013.01)

(58) Field of Classification Search
CPC ...... B60H 1/00885; B60H 1/143; B60K 1/00; B60K 11/02; B60K 2001/003;
(Continued)

(56) References Cited

U.S. PATENT DOCUMENTS

| | | | |
|---|---|---|---|
| 6,616,059 B2 * | 9/2003 | Sabhapathy | .......... B60W 10/30 237/12.3 B |
| 11,370,293 B2 * | 6/2022 | Merz | ................... F16H 57/0436 |

(Continued)

FOREIGN PATENT DOCUMENTS

| | | |
|---|---|---|
| CN | 101480914 A | 7/2009 |
| CN | 10466316 A | 11/2019 |

OTHER PUBLICATIONS

European Examination Report dated Feb. 6, 2025 issued in European Application No. 22726630.1.
(Continued)

*Primary Examiner* — Tyler J Lee
(74) *Attorney, Agent, or Firm* — Troutman Pepper Locke LLP; Dustin B. Weeks; Nicholas H. Doss

(57)     ABSTRACT

Aspects of the present invention relate to a control system (100) comprising one or more controllers (105), the control system comprising input means (130) to receive a temperature signal (135) indicative of a temperature of a transmission (160) associated with a traction electric machine (150) of a vehicle, output means (140) to output a control signal (145) for causing a fluidic communication of thermal energy from a heat source to a transmission heat exchanger (190) for heating the transmission, and processing means (110)
(Continued)

arranged to control the output means to output the control signal in dependence on the temperature signal.

18 Claims, 12 Drawing Sheets

(58) Field of Classification Search
CPC ........ B60L 1/003; B60L 1/02; B60L 15/2054; F01M 5/001; F16H 57/0413
See application file for complete search history.

(56) References Cited

U.S. PATENT DOCUMENTS

| | | | | |
|---|---|---|---|---|
| 11,590,959 | B2 * | 2/2023 | Johnson | .................. F16H 61/16 |
| 2003/0127528 | A1 * | 7/2003 | Sabhapathy | .......... B60L 3/0023 |
| | | | | 237/12.3 B |
| 2004/0069546 | A1 * | 4/2004 | Lou | ......................... F01P 7/167 |
| | | | | 180/65.265 |
| 2014/0070013 | A1 | 3/2014 | Stanek | |
| 2015/0377537 | A1 * | 12/2015 | West | ...................... F25B 49/022 |
| | | | | 62/115 |
| 2016/0010520 | A1 * | 1/2016 | Will | ....................... F01M 5/001 |
| | | | | 123/196 AB |
| 2016/0059733 | A1 | 3/2016 | Hettrich et al. | |
| 2017/0210390 | A1 | 7/2017 | Porras et al. | |
| 2017/0217328 | A1 | 8/2017 | Patel | |
| 2018/0209393 | A1 | 7/2018 | Revach | |
| 2019/0344635 | A1 | 11/2019 | Stacey | |
| 2021/0039491 | A1 | 2/2021 | Merz et al. | |
| 2022/0212655 | A1 * | 7/2022 | Johnson | .................. F16H 59/44 |

OTHER PUBLICATIONS

Combined Search and Examination Report for Application No. GB2106216.1, dated Oct. 26, 2021, 6 pages.
International Search Report and Written Opinion for Application No. PCT/EP2022/061460, dated Aug. 12, 2022, 16 pages.
Notice of First Examination Opinion received in related Chinese Patent Application No. CN2022800289.4, mailed Apr. 20, 2026 (with machine translation) (23 pages).

* cited by examiner

CONTROL SYSTEM, SYSTEM AND METHOD FOR AN ELECTRIC VEHICLE

TECHNICAL FIELD

The present disclosure relates to apparatus and methods for an electric vehicle. Aspects of the invention relate to a control system, to a system for an electric vehicle, to a vehicle, to a method, and to computer software.

BACKGROUND

It has been observed that electric vehicles exhibit less efficiency at cold temperatures. In particular, the efficiency may be less when the vehicle is first operated. It is an aim of the present invention to address one or more of the disadvantages associated with the prior art.

SUMMARY OF THE INVENTION

Aspects and embodiments of the invention provide a control system, a system, a system for an electric vehicle, a method or computer software as claimed in the appended claims.

According to an aspect of the present invention there is provided a control system comprising one or more controllers, the control system being arranged to receive a temperature signal indicative of a temperature of a transmission associated with a traction electric machine of a vehicle, and to output a control signal for causing heating of the transmission in dependence on the temperature signal. Advantageously, the transmission is caused to be heated which may improve an efficiency of the transmission. The efficiency may be improved by heating of lubricant fluid within the transmission.

According to an aspect of the present invention there is provided a control system comprising one or more controllers, the control system comprising input means to receive a temperature signal indicative of a temperature of a transmission associated with a traction electric machine of a vehicle, output means to output a control signal for causing a fluidic communication of thermal energy from a heat source to a transmission heat exchanger for heating the transmission, processing means arranged to control the output means to output the control signal in dependence on the temperature signal. Advantageously, the transmission is caused to be heated which may improve an efficiency of the transmission. The efficiency may be improved by heating of lubricant fluid within the transmission.

The control signal may cause the fluidic communication of thermal energy from a heat source directly to a transmission lubricant. Advantageously heat is more efficiently communicated to the transmission lubricant.

The processing means may be arranged to control the output means in dependence on a temperature threshold. Advantageously the temperature threshold improves an accuracy of control of the heating. The processing means is optionally arranged to compare the temperature signal and the temperature threshold to determine whether to control the output means to output the control signal to cause heating of the transmission. Advantageously the comparison is indicative of whether to heat the transmission. In some embodiments, hysteresis is employed in the comparison. Advantageously the hysteresis may avoid frequent changes in the heating state.

The input means may be arranged to receive a journey signal indicative of a likelihood of a journey of the vehicle commencing. Advantageously control of the heating may be made in advance of a journey commencing.

The processing means is optionally arranged to control the output means to output the control signal in dependence on the journey signal to cause heating the transmission prior to the journey of the vehicle commencing. Advantageously an efficiency of the transmission may be improved at a start of the journey.

The control signal may be arranged to control one or more of pumping means and/or valve means to circulate heated fluid via the transmission heat exchanger. Advantageously one or more of pumping means and/or valve means is used to control the flow of heated fluid via the heat exchanger. The control signal is optionally arranged to control one or more of pumping means and valve means to circulate heated fluid via a traction battery of the vehicle. Advantageously the fluid may be used to heat the traction battery to improve an efficiency of the traction battery.

According to another aspect of the present invention there is provided a system, comprising a control system as described above, temperature sensing means arranged to output the temperature signal to the control system, the temperature signal being indicative of a temperature of at least a portion of a transmission associated with a traction electric machine of a vehicle, and fluid control means arranged to receive a control signal output by the control system, wherein the fluid control means is arranged to control fluid communication of thermal energy from a heat source to a transmission heat exchanger for heating the transmission.

The fluid control means optionally comprises a pump arranged to circulate heated fluid via the transmission heat exchanger. The fluid control means optionally comprises a valve arranged to direct the heated fluid via the transmission heat exchanger. The temperature sensing means may be thermally coupled with the transmission. Advantageously an accuracy of the temperature sensing means may be improved via the thermal coupling.

According to a still further aspect of the present invention there is provided a system for an electric vehicle, comprising a fluid communication system for fluidicly communicating thermal energy from a heat source to a transmission heat exchanger for heating a transmission associated with a traction inverter and traction electric machine of the vehicle, temperature sensing means arranged for outputting a temperature signal indicative of a temperature of at least a portion of the transmission, and a control system comprising an input means to receive the temperature signal, an output means to output a control signal for causing circulation of the fluid in the fluid communication system, wherein the control system is arranged to output the control signal in dependence on the temperature signal.

The transmission heat exchanger may be arranged to receive heated fluid to transfer thermal energy from the heated fluid to a lubricant of the transmission. The transmission heat exchanger optionally comprises a electric machine portion for circulating coolant fluid in thermal communication with the traction electric machine.

Optionally the fluid communication system comprises a heat source heat exchanger having first and second fluid circuits, the heat source heat exchanger being arranged to circulate fluid received from the heat source through the second fluid circuit and to communicate thermal energy from the received fluid to fluid in the first fluid circuit, wherein the fluid communication system is arranged to circulate fluid from the first fluid circuit of the heat source heat exchanger to the transmission heat exchanger.

The fluid communication system is optionally arranged to fluidicly communicate thermal energy from the heat source to a traction battery of the electric vehicle. The first fluid circuit is optionally arranged to communicate thermal energy to the traction battery. The traction battery and the transmission heat exchanger may be arranged in parallel branches of the first fluid circuit. Optionally the heat source comprises one or more of an electrical heater or a heat pump.

According to another aspect of the present invention there is provided a vehicle comprising a control system as described above or a system as described above.

According to yet another aspect of the present invention there is provided a method, comprising determining a temperature of a transmission associated with a traction electric machine of a vehicle, and causing fluidic communication of thermal energy from a heat source to a transmission heat exchanger for heating the transmission in dependence on the temperature of the transmission.

The method may comprising determining whether the temperature of the transmission is below a temperature threshold and causing the fluidic communication of thermal energy when the temperature is less than the temperature threshold. The method may comprise receiving a journey signal indicative of a likelihood of a journey of the vehicle commencing, wherein the fluidic communication is caused in dependence on the journey signal. The causing fluidic communication optionally comprises controlling one or more flow control means to control the fluidic communication of thermal energy from the heat source to a transmission heat exchanger. The method may comprise causing fluidic communication of thermal energy from a heat source to a traction battery of the vehicle.

According to an aspect of the present invention there is provided a control system, comprising one or more controllers, for an electric vehicle, the control system comprising input means to receive a temperature signal indicative of a temperature of a transmission of the vehicle, output means to output a flow control signal for controlling a flow control means to control a flow of lubricant fluid, and processing means arranged to control the output means to output the flow control signal in dependence on the temperature signal. Advantageously, the flow of lubricant fluid is controlled to control a temperature of the transmission. The control of the temperature of the transmission may improve an efficiency of the transmission.

According to an aspect of the present invention there is provided a control system, comprising one or more controllers, for an electric vehicle, the control system comprising input means to receive a temperature signal indicative of a temperature of a transmission associated with a traction electric machine of the vehicle, output means to output a flow control signal for controlling a flow control means to control a flow of lubricant fluid associated with the traction electric machine and the transmission through a heat exchanger, and processing means arranged to control the output means to output the flow control signal in dependence on the temperature signal. Advantageously, the flow of lubricant fluid is controlled to control a temperature of the transmission. The control of the temperature of the transmission may improve an efficiency of the transmission.

The processing means is optionally arranged to control the output means to output the flow control signal in dependence on the temperature signal to cause the traction electric machine to heat the transmission. Advantageously, heating of the transmission may improve the efficiency of the transmission. The output means may be arranged to output a heat control signal for causing the electric machine to operate in a loss operating mode for heating the lubricant fluid. Advantageously the electric machine may be caused to generate additional heat to heat the lubricant fluid, which may in turn heat the transmission. The processing means may be arranged to control the output means to output the heat control signal in dependence on the temperature signal. Advantageously, the operation of the electric machine in the loss mode may be made dependent on the temperature.

The processing means is optionally arranged to control the output means to output the heat control signal whilst the vehicle is stationary. Advantageously, the loss mode may be utilised to generate heat even when the electric machine is not used for propulsion.

The flow control signal may be indicative of a proportion of the flow of lubricant fluid through the heat exchanger and at least one bypass fluid path, respectively. Advantageously, control of the heating may be achieved by directing the lubricant fluid through the heat exchanger or the bypass fluid path. Optionally the processing means is arranged to determine the proportion of the flow of lubricant through the heat exchanger and the at least bypass fluid path in dependence on the temperature signal. Advantageously, control of the lubricant fluid through the heat exchanger or the bypass fluid path is performed dependent on the temperature. The processing means may be arranged to control the output means to output the flow control signal in dependence on a temperature threshold. Advantageously, heating of the transmission may only be performed with respect to the temperature threshold.

The processing means is optionally arranged to determine the proportion of the flow of lubricant fluid through the heat exchanger to maintain the temperature of the transmission above the temperature threshold. Advantageously, the flow of lubricant fluid is performed to maintain the temperature of the transmission. The input means may be arranged to receive a heat request signal indicative of a request for heating of one or both of a traction battery of the vehicle and a cabin of the vehicle. Advantageously, heating of the traction battery or the cabin may be requested. The processing means is optionally arranged to control the output means to output the flow control signal in dependence on the heat request signal. Advantageously, heat from the lubricant fluid may be used to satisfy the request for heating. The processing means may be arranged to control the output means to output a pump control signal to cause a pump to circulate the flow of lubricant fluid through one or both of the transmission and the traction electric machine. Advantageously, the lubricant fluid may be circulated to control the heating. The at least one bypass fluid path may comprise one or more conduits allowing a circulation of lubricant fluid between the electric machine and the transmission bypassing the heat exchanger. Advantageously, the bypass fluid path may be used to control a heat output.

According to another aspect of the present invention there is provided a coolant system for a traction electric machine of a vehicle, comprising a heat exchanger for exchanging thermal energy between lubricant fluid and a coolant fluid, flow control means for controlling a flow of the lubricant fluid through the heat exchanger, wherein the lubricant fluid is associated with the traction electric machine and a transmission of the traction electric machine, and a control system according to any preceding claim, wherein the flow control means is arranged to receive the flow control signal from the control system and to control the flow of lubricant fluid through the heat exchanger in dependence thereon.

The coolant system may comprise at least one bypass fluid path for allowing at least a portion of the flow of lubricant fluid to bypass the heat exchanger, wherein the flow control means is arranged to control the proportion of the flow of lubricant fluid through the heat exchanger and the bypass fluid path respectively in dependence on the flow control signal. The coolant system may comprise a coolant fluid circuit arranged to circulate coolant fluid therethrough via the heat exchanger. Advantageously, the coolant fluid may exchange heat with the transmission via the heat exchanger.

The coolant fluid circuit is optionally arranged to circulate coolant fluid therethrough via an electric machine coolant portion for circulating coolant fluid therethrough in thermal communication with the traction electric machine. Advantageously, the coolant fluid may be heated via thermal communication with the electric machine. The electric machine coolant portion may comprise one or more fluid conduits in thermal communication with a casing of the traction electric machine. Advantageously, efficient thermal communication is achieved. The coolant fluid circuit optionally comprises an inverter coolant portion for circulating coolant fluid therethrough in thermal communication with an inverter associated with the traction electric machine. Advantageously, the coolant fluid may be heated via thermal communication with the inverter. The heat exchanger is optionally arranged to receive the lubricant fluid from the transmission. Advantageously, the heat exchanger communicates heat with the lubricant fluid. The coolant fluid circuit optionally comprises a traction battery circuit for circulating coolant fluid in thermal communication with a traction battery of the vehicle for heating the traction battery. Advantageously, the coolant may communicate heat with the traction battery. The coolant fluid circuit comprises a cabin heating circuit for circulating coolant fluid in thermal communication with a cabin heater of the vehicle for heating the cabin of the vehicle. Advantageously, the coolant may communicate heat for heating the cabin.

According to an aspect of the present invention there is provided a vehicle comprising a control system as described above or a coolant system as described above.

According to an aspect of the present invention there is provided a computer-implemented method, comprising receiving a temperature signal indicative of a temperature of a transmission associated with a traction electric machine of a vehicle, and controlling flow of lubricant fluid associated with a traction electric machine and a transmission of the vehicle through a heat exchanger in dependence on the temperature signal. The flow of lubricant fluid may be controlled in dependence on the temperature signal to cause the traction electric machine to heat the transmission. The method may comprise determining a proportion of the flow of lubricant fluid through the heat exchanger and at least one bypass fluid path, respectively, and controlling flow of lubricant fluid in dependence on the determined proportion. The proportion of the flow of lubricant fluid through the heat exchanger may be determined to maintain the temperature of the transmission above a temperature threshold.

According to an aspect of the present invention, there is provided a control system, comprising one or more controller, for an electric vehicle having a transmission associated with a traction electric machine, the control system comprising input means to receive a heat request signal indicative of a request for heating of one or more modules of the vehicle, output means to output a control signal for causing the transmission to output heat for the one or more modules of the vehicle, and processing means arranged to determine transmission heating power, and to compare the transmission heating power and electric heating power for the request for heating, wherein the processing means is arranged to control the output means to output the control signal in dependence on the comparison. Advantageously heat is output from the transmission when more efficient than utilising electrical heating.

According to another aspect of the present invention, there is provided a control system, comprising one or more controller, for an electric vehicle, the control system comprising input means (130) to receive a heat request signal (1010) indicative of a request for heating of one or more modules of the vehicle, and a temperature signal indicative of a temperature of a transmission (160) associated with a traction electric machine (150) of the vehicle, output means (140) to output a control signal (1020) for causing a heat exchanger (660) associated with the transmission (160) to output heat for the one or more modules of the vehicle, and processing means (110) arranged to determine transmission heating power in dependence on the temperature signal, and to compare the transmission heating power and electric heating power for the request for heating, wherein the processing means is arranged to control the output means to output the control signal in dependence on the comparison. Advantageously heat is output from the transmission when more efficient than utilising electrical heating.

The electrical heating power may be a direct electrical heating power or a heat pump heating power. Advantageously, the transmission heating power is compared against a cost of direct electrical heating or heat pump heating. The heating power may be electrical power consumption. Advantageously, the power consumption using electrical heating is considered. The control signal is a flow control signal for controlling a flow control means to control a flow of lubricant fluid associated with the traction electric machine and the transmission through the heat exchanger. Advantageously the flow of lubricant is controlled to control heat output from the transmission. The determining the transmission heating power comprises determining a current power loss of the transmission in dependence on the temperature signal. Advantageously the current power loss of the transmission considers efficiency of using the transmission to provide heat output. Determining the transmission heating power may comprise determining a minimum power loss for the transmission. Advantageously the power loss of the transmission is considered in determining whether to use the transmission as a heat source. The transmission heating power may be determined in dependence on the current power loss and the minimum power loss of the transmission. Advantageously both the current power loss and minimum power loss are considered. The processing means may be arranged to control the output means to output the control signal to reduce heat output from the heat exchanger in dependence on the comparison indicating the electrical heating power being less than the transmission heating power. Advantageously electrical heating is used when more efficient.

The processing means is optionally arranged to control the output means to output the control signal to increase heat output from the heat exchanger in dependence on the comparison indicating the transmission heating power being less than the electrical heating power. Advantageously the transmission is used as a heat source when more efficient. The processing means may be arranged to control the output means to output the control signal in a stepwise manner. Advantageously the heat output from the transmission is changed gradually or incrementally.

In said stepwise manner, the processing means may be arranged to control the output means to output the control signal indicative of an increase in heat output, and to determine the transmission heating power in dependence on a change in temperature of the transmission. Advantageously the change is temperature of the transmission is considered after each increase in heat output. The processing means may be arranged to control the output means to output the control signal to control the flow control means to increase the flow of lubricant fluid through the heat exchanger to increase the heat output. Advantageously the flow of lubricant is used to control the heat output. The processing means is arranged to control the output means to output a pump control signal to cause a pump to circulate the flow of lubricant fluid through one or both of the transmission and the traction electric machine output heat for the one or more modules of the vehicle. Advantageously the pump is controlled to circulate lubricant to thereby control heat output.

According to a still further aspect of the present invention, there is provided a coolant system for a traction electric machine of a vehicle, comprising a heat exchanger for exchanging thermal energy between lubricant fluid and a coolant fluid, flow control means for controlling a flow of the lubricant fluid through the heat exchanger, wherein the lubricant fluid is associated with the traction electric machine and a transmission of the traction electric machine, and a control system according to any preceding claim, wherein the flow control means is arranged to receive the control signal from the control system and to control the flow of lubricant fluid through the heat exchanger in dependence thereon. The coolant system may comprise at least one bypass fluid path for allowing at least a portion of the flow of lubricant fluid to bypass the heat exchanger, wherein the flow control means is arranged to control the proportion of the flow of lubricant fluid through the heat exchanger and the bypass fluid path respectively in dependence on the control signal.

The coolant system may comprise a coolant fluid circuit arranged to circulate coolant fluid therethrough via the heat exchanger for communicating heat to the one or more modules of the vehicle. The coolant fluid circuit is optionally arranged to circulate coolant fluid therethrough via an electric machine coolant portion for circulating coolant fluid therethrough in thermal communication with the traction electric machine. The electric machine coolant portion may comprise one or more fluid conduits in thermal communication with a casing of the traction electric machine. The coolant fluid circuit may comprise an inverter coolant portion for circulating coolant fluid therethrough in thermal communication with an inverter associated with the traction electric machine. The heat exchanger may be arranged to receive the lubricant fluid from the transmission. The one or more modules of the vehicle may comprise a traction battery of the vehicle. The coolant fluid circuit may comprise a traction battery circuit for circulating coolant fluid in thermal communication with the traction battery of the vehicle for heating the traction battery. The one or more modules of the vehicle may comprise a cabin heater and the coolant fluid circuit comprises a cabin heating circuit for circulating coolant fluid in thermal communication with the cabin heater for heating at least a portion of the cabin of the vehicle.

According to yet another aspect of the present invention, there is provided a vehicle comprising a control system as described above or a coolant system as described above.

According to a still further aspect of the present invention, there is provided a computer-implemented method, comprising receiving a heat request signal indicative of a request for heating of one or more modules of the vehicle, and a temperature signal indicative of a temperature of a transmission associated with a traction electric machine of a vehicle, determining transmission heating power in dependence on the temperature signal, comparing the transmission heating power and electric heating power for the request for heating, and controlling the transmission to output heat from a heat exchanger for the one or more modules of the vehicle in dependence on the comparison. The determining the transmission heating power comprises determining a current power loss of the transmission in dependence on the temperature signal. Determining the transmission heating power may comprise determining a minimum power loss for the transmission. The transmission heating power may be determined in dependence on the current power loss and the minimum power loss of the transmission. The method may comprise controlling the transmission to increase heat output from the heat exchanger in dependence on the comparison indicating the transmission heating power being less than the electrical heating power.

According to an aspect of the present invention there is provided computer software which, when executed by a processing means, is arranged to perform a method according to any of the aspects described above. Optionally the computer software is tangibly stored on a computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Embodiments of the present invention are provided for controlling a temperature of one or more components of a vehicle. Some embodiments of the present invention are provided for heating a transmission system associated with a vehicle. Other embodiments of the present invention are provided for heating other modules of a vehicle. The heating may be achieved by utilising heat from an electric machine of the vehicle, such as a traction electric machine thereof.

Figure 1A:
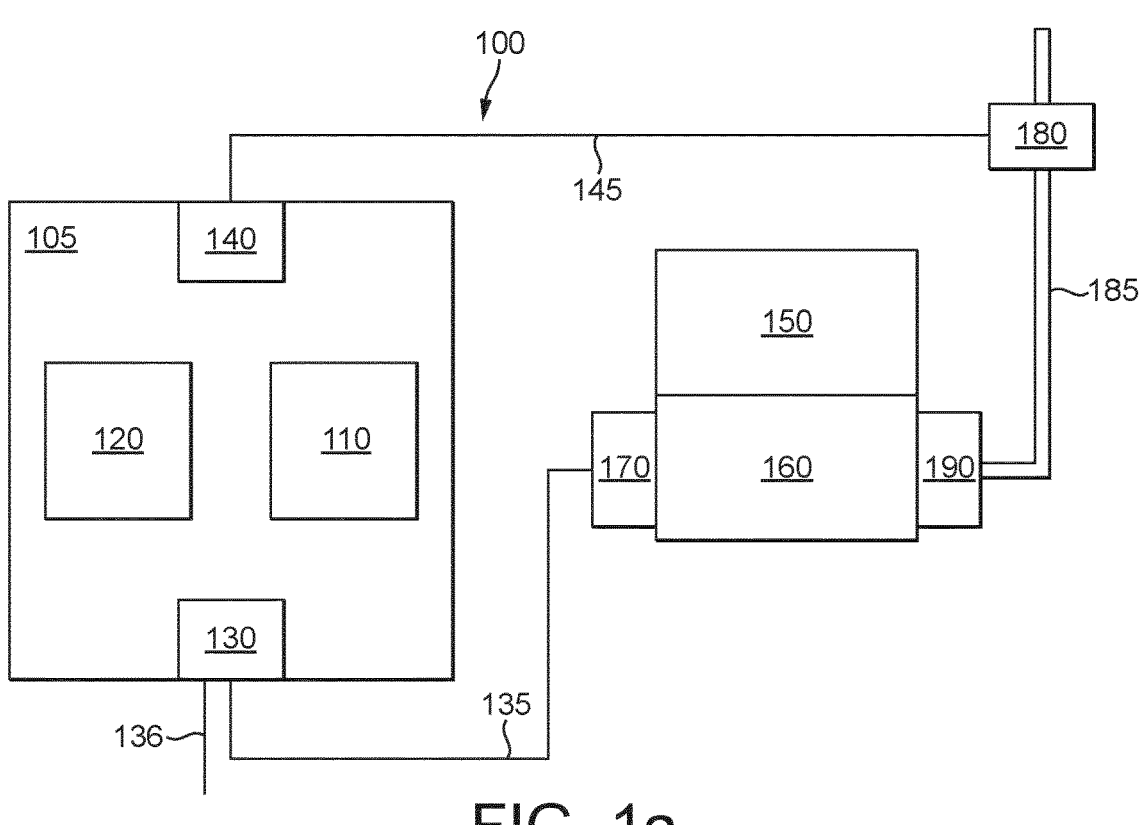
FIGS. 1a and 1b each show a schematic illustration of a system according to an embodiment of the invention.
Figure 1B:
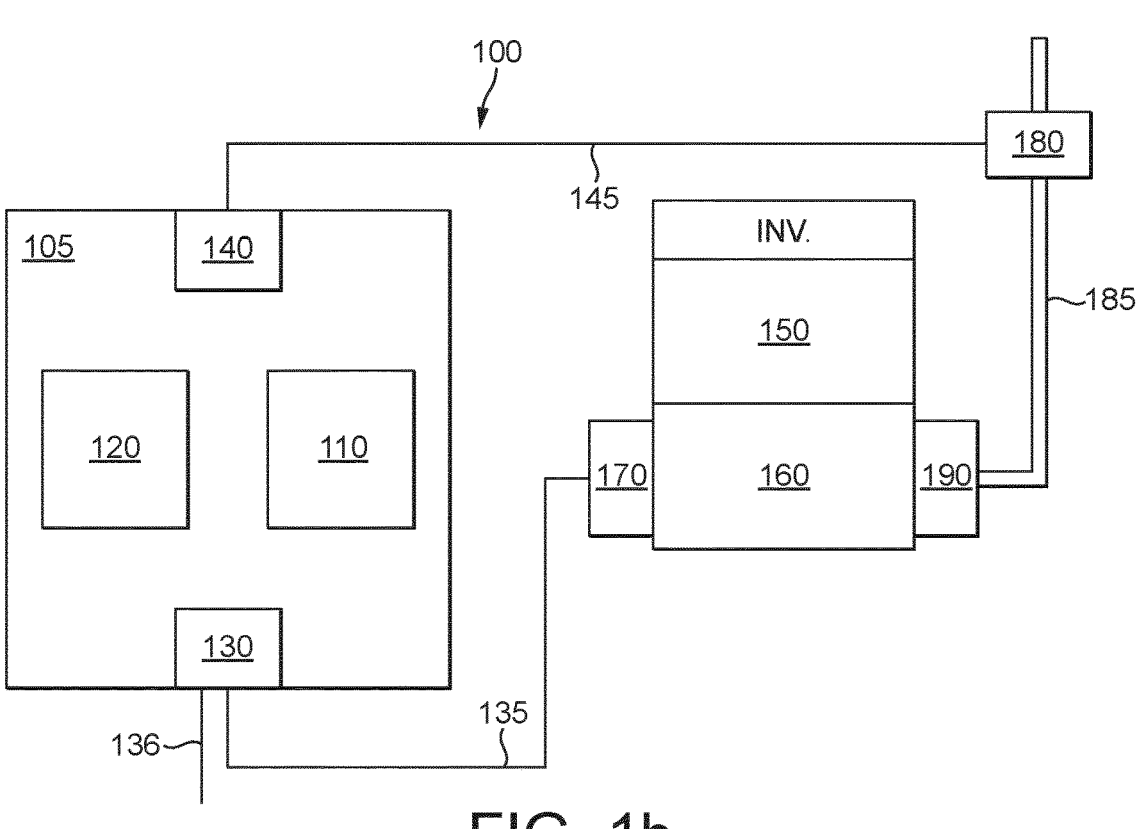

With reference to FIGS. 1*a* and 1*b*, a system 100 is illustrated which comprises a control system 105 according to an embodiment of the present invention. The control system 105 may be formed by one or more electronic controller 105. Each controller 105 may comprise a respective processing means 110, such as an electronic processing device 110 or computer processor. The processing device 110 is arranged to operably execute computer-readable instructions which may be stored in a memory means 120 formed by one or more memory devices 120 forming a memory 120 which is communicatively coupled to the processing device 110.

Figure 13:
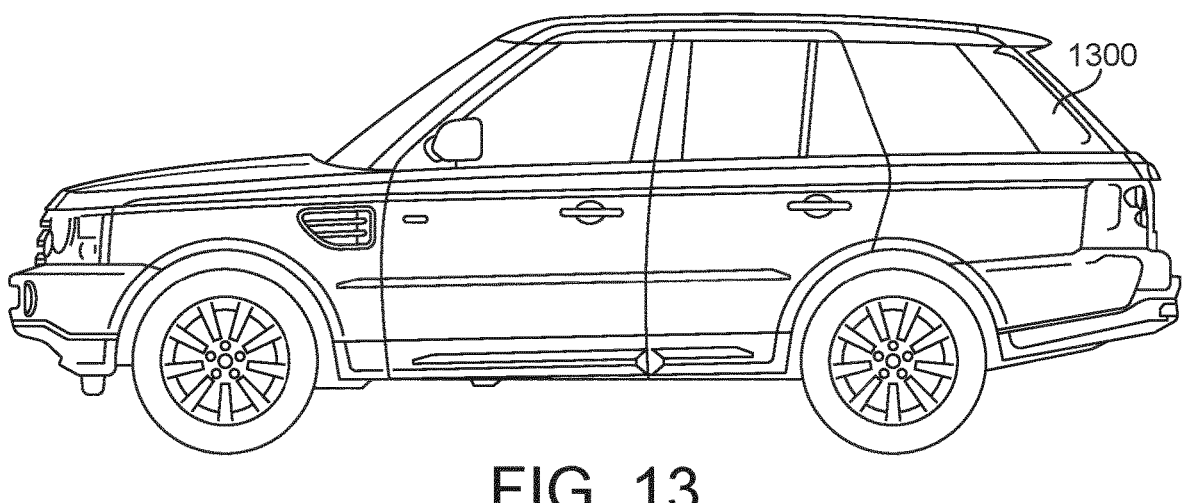
FIG. 13 shows a vehicle according to an embodiment of the invention.

The system 100 further comprises an electric machine 150 operable as a traction electric machine 150 and a transmission 160 associated therewith for an electric vehicle, such as a vehicle 1300 illustrated in FIG. 13. In use, the traction electric machine 150 provides torque to one or more wheels of the vehicle 1300 via the transmission 160. The electric machine 150 is associated with a unit 155 which comprises traction power electronics, such as an inverter, for providing an electrical supply to the traction electric machine 150. The transmission 160 provides at least one gear ratio between an output of the traction electric machine 150 and the one or more wheels of the vehicle. In some embodiments, the traction electric machine 150 and the transmission 160 may be integrated into a single unit or housing to provide an electric drive unit (EDU) for the vehicle. The traction electric machine 150 and the transmission 160 may be associated with one or more wheels of the vehicle. In some embodiments, the traction electric machine 150 and the transmission 160 are associated with an axle of the vehicle arranged to provide torque to first and second wheels associated with the axle, which may be each disposed at respective ends of the axle. However it will be appreciated that the EDU may be associated with only one wheel of the vehicle.

The transmission 160 has a lubricant fluid for lubricating components of the transmission 160. The traction electric machine 150 and the transmission 160 may share the lubricant fluid. That is, the lubricant fluid may be circulated between the traction electric machine 150 and the transmission 160, such as when formed as the EDU. In some embodiments, a temperature sensing means 170, such a temperature sensing device 170, which may be a thermocouple or similar, is arranged to measure a temperature of the transmission 160. In some embodiments, the temperature sensing device 170 may be arranged to measure the temperature of the lubricant fluid in particular. In some embodiments, the temperature sensing device 170 may be associated with a sump of the transmission 160 or EDU to measure a temperature of the lubricating fluid within the sump, although other arrangements may be envisaged. The temperature sensing device 170 operatively outputs a temperature signal 135 indicative of the temperature of the transmission 160 associated with the traction electric machine 150.

The controller 105 comprises an input means 130 and an output means 140. The input means 130 may comprise an electrical input 130 of the controller 105 The output means 140 may comprise an electrical output 140 of the controller 105. The input 130 is arranged to receive the temperature signal 135. The temperature signal 135 is an electrical signal which is indicative of the temperature of the transmission 160 associated with the traction electric machine 150 of the vehicle. The temperature may be an internal temperature of the transmission 160. In some embodiments, the temperature is a temperature of the lubricating fluid of the transmission 160. However it will be appreciated that in other embodiments the temperature signal 135 may be derived from other measurements or signals to be indicative of the temperature of the transmission 160.

The output 140 of the controller 105 is arranged to operably output a control signal 145 under control of the processing device 110. The control signal 145 is for controlling the temperature of the transmission 160. In particular, in embodiments of the invention, the control signal 145 is for causing heating of the transmission 160, as will be explained.

The control signal 145, in some embodiments, is arranged to cause fluidic communication of thermal energy from a heat source for heating the transmission 160. By fluidic communication it is meant that the thermal energy, or heat, is communicated by one or more fluids i.e. that the same fluid may not necessarily carry the thermal energy from the heat source to the transmission 160. In some embodiments, the thermal energy may be carried or exchanged between fluids via one or more heat exchangers. However in some embodiments it will be appreciated that the fluid may be heated directly by a heat source such as a heater and the fluid communicated to directly heat the transmission 160.

In the embodiment shown in FIGS. 1*a* and 1*b*, the system 100 comprises a transmission heat exchanger 190 which is thermally coupled with the transmission 160. The transmission heat exchanger 190 is arranged to receive a fluid therein, referred to as a coolant fluid, with it being understood that the coolant fluid is a fluid which may be heated to provide thermal energy to the transmission 160. Thus the term coolant does not necessarily imply that the fluid is for cooling. The coolant fluid may be a suitable fluid having a heat capacity greater than water or other desirable characteristics for communicating thermal energy. Furthermore, it will be appreciated that via suitable control means such as valves the coolant fluid may, at other times during operation, be used to cool the transmission 160. The coolant fluid is communicated to the transmission heat exchanger 190 via a coolant circuit 185. Although not shown in FIGS. 1*a* and 1*b*, it will be realized that the coolant circuit 185 may comprise both a supply and return coolant conduits for communicating heated coolant fluid to the transmission heat exchanger 190 and returning coolant having less or reduced thermal energy after having heated the transmission 160. The system 100 comprises a flow control means 180 which is arranged to control the flow of coolant via the coolant circuit 185 to the transmission heat exchanger 190. The flow control means 180 is arranged to receive the control signal 145 output from the controller 105 to control the flow of coolant to the transmission heat exchanger 190. In particular, the flow control means 180 is arranged to control the flow of heated coolant fluid to the transmission heat exchanger 190 to operably cause heating of the transmission 160 by the heated coolant fluid.

The flow control means 180 may comprise one or more valve means and pumping means, such as one or more valves and one or more pumps associated with the coolant circuit 185. The one or more valves and one or more pumps control, in dependence on the control signal 145, the flow of heated coolant fluid to the transmission heat exchanger 190. In response to the control signal 145 the flow control means 180 is arranged to circulate heated fluid to the transmission heat exchanger 190 for heating the transmission 160. As will be explained, in some embodiments, the control signal 145 is arranged to control one or more of pumping means and valve means to circulate heated fluid via a traction battery of the vehicle 1300.

The processor 110 is arranged to receive temperature data in the form of the temperature signal 135 provided to the input 130 of the controller 105 and to control the output 140 of the controller 105 to output the control signal 145 in dependence on the temperature signal 135. The control signal 145 may be referred to as a flow control signal 145 in some embodiments.

In some embodiments, the processor 110 is arranged to control the output 140 in dependence on a temperature threshold. Data indicative of the temperature threshold may be stored in the memory 120 of the controller 105. The temperature threshold is indicative of a temperature at or below which the transmission 160 is to be heated for improving efficiency of the transmission 160 communicating torque to the one or more wheels of the vehicle. For example the temperature threshold may be indicative of a temperature such as 10° C. or 5° C. at or below which transmission 160 should be heated, although other temperatures may be selected.

The processing means 110 is arranged, in some embodiments, to compare the temperature indicated by the temperature signal 135 and the temperature threshold to determine whether to control the output 140 to output the control signal 145 to cause heating of the transmission 160. In some embodiments, hysteresis is employed by the processing means 110 in the comparison whereby two temperature thresholds are utilised, one of which indicates a temperature to commence heating of the transmission 160 and one of which indicates a temperature to cease heating of the transmission to advantageously prevent frequent switching of the heating of the transmission 160. In some embodiments, the processing means 110 of the controller 105 is arranged to determine whether the temperature of the transmission 160 is at or below the temperature threshold and to control heating of the transmission 160 dependent thereon, prior to a journey of the vehicle commencing i.e. that is before the traction electric machine 150 and the transmission 160 are used to provide motive or traction torque for the vehicle.

In some embodiments the input 130 of the controller 105 is arranged to receive a journey signal 136 indicative of a likelihood of a journey of the vehicle commencing. The journey signal 136 may be provided from another controller of the vehicle, such as a body control module (BCM). The journey signal 136 may be generated in dependence on one or more events which indicate that the vehicle may be shortly used for a journey. The journey signal 136 may be generated in dependence on, for example, one or more apertures such as doors of the vehicle 1300 being unlocked or opened. The journey signal 136 may be generated in dependence on a location of a user of the vehicle, where the location may be determined in dependence on a location of a mobile device of the user, such as a telephone or wireless keyfob associated with the vehicle. When the user is determined to be approaching the vehicle, the journey signal 136 is provided to the controller 105 in dependence thereon. In some embodiments, the journey signal 136 may be generated in dependence on a diary or schedule associated with the user being indicative of an upcoming event, such as a regular journey or scheduled meeting, for example, requiring a journey to be made by the vehicle. In dependence on the time of the expected journey, the journey signal 136 is generated at a predetermined time ahead of the expected journey. The predetermined time may be, for example, 5 or 10, 30 minutes or 1 hour or more, such as 2 hours in advance of a start time of the expected journey. Thus the processor 110 is arranged to control the output 140 to output the control signal 145 in dependence on the journey signal 136 to cause heating the transmission 160 prior to the journey of the vehicle commencing. In this way, when the vehicle of the journey commences the transmission 160 may be advantageously heated to improve efficiency of the vehicle 1300.

Figure 2:
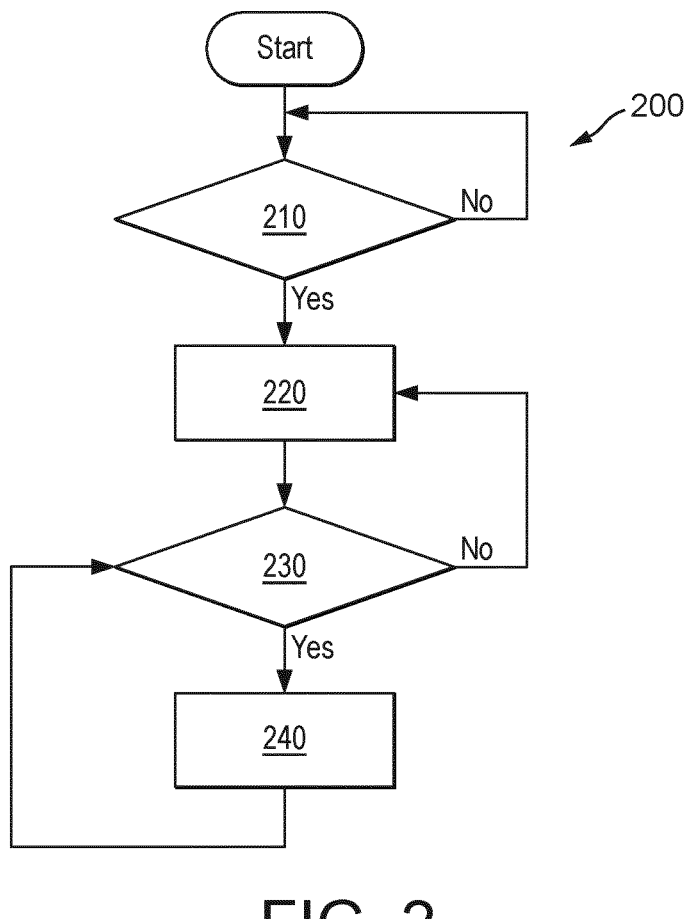
FIG. 2 shows a method according to an embodiment of the invention.

FIG. 2 illustrates a method 200 according to an embodiment of the invention. The method 200 is a method of controlling the temperature of the transmission 160 associated with the traction electric machine 150 of the vehicle. The method 200 may be performed in the system 100 described above with reference to FIGS. 1a and 1b. To aid understanding of the method 200, reference is also made to FIG. 3 which illustrates a temperature 310 of the transmission 160 over time, as will be explained.

Figure 3:
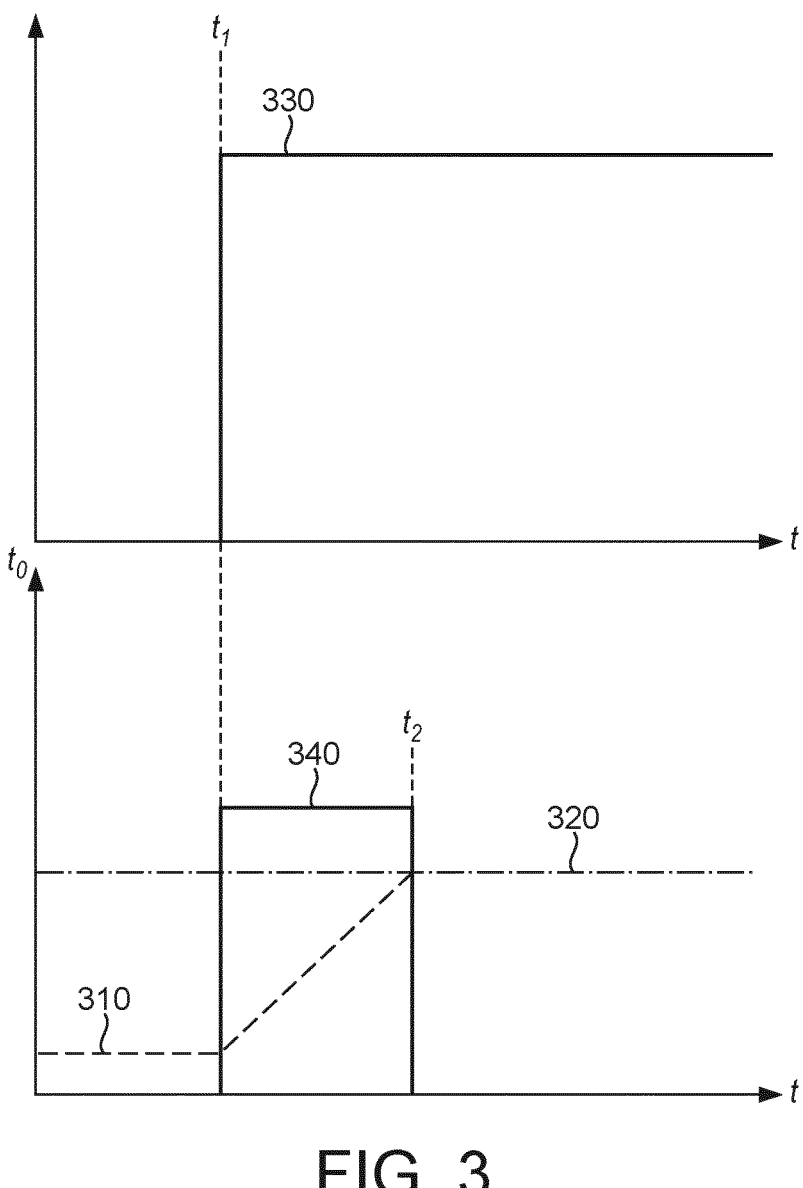
FIG. 3 shows signals and temperature in a system according to an embodiment of the invention.

The method 200 comprises a block 210 of determining whether a journey signal 330 has been received. The journey signal 330 is illustrated in FIG. 3 as active high, although other configurations may be envisaged. If the journey signal 330 has been received the method moves to block 220. If the journey signal 330 hasn't been received, the method 200 loops back to block 210 i.e. doesn't progress until the journey signal 330 is received. Once the journey signal 330 has been received, the method progresses. Referring to FIG. 2, the journey signal 330 is received at time $t_1$.

The method 200 comprises a block of determining 220 the temperature 310 of the transmission 160 associated with the traction electric machine 150 of the vehicle 1300. In particular, block 210 comprises receiving the temperature signal 135 indicative of the temperature of the transmission 160. The temperature signal 135 may be received at the input 130 of the controller 105 illustrated in FIGS. 1a and 1b from the temperature sensing device 170 associated with the transmission 160. The temperature signal 135 may be indicative of the temperature of the lubricant fluid within the transmission 160. As indicated in FIG. 3, at a start of the method i.e. t=0 the transmission 160 may have a first temperature 310, such as a temperature of 2° C. in a relatively cold environment of the vehicle.

The method 200 comprises a block 230 of determining whether the temperature 310 of the transmission 160 is less than a predetermined temperature threshold 320 as illustrated in FIG. 2. In FIG. 2 at time $t_1$ when block 230 is performed (or substantially immediately thereafter) the temperature 310 of the transmission 160 is less than the temperature threshold 320. In this case, the method 200 moves to block 240. If, however, the temperature of the transmission 160 is greater than or equal to the threshold 320, the method 200 returns to block 220, as in FIG. 2, or may end.

In block 240 the transmission 160 is heated. In particular, the lubricant fluid within the transmission 160 is heated in some embodiments. Block 240 in some embodiments comprises causing fluidic communication of thermal energy from a heat source to the heat exchanger 190 associated with the transmission 160 for heating the transmission 160. The heat source may in some embodiments be a high-voltage (HV) heater of the vehicle. By HV it is understood that the heater has a voltage of greater than 50V such as 250V or more. The heater voltage may be around 400V in some embodiments. In the system of FIGS. 1a and 1b, block 240 comprises the controller 105 outputting the control signal 145, indicated as signal 340 in FIG. 3, to the flow control means 180 to allow heated fluid to communicate the thermal energy to the transmission heat exchanger 190 i.e. to heat the lubricant fluid of the transmission 160 via the heat exchanger 190. As can be appreciated from FIG. 3, in dependence on the control signal 340, the temperature 310 of the transmission 160 is caused to rise over time as thermal energy is communicated to the transmission 160, particularly to the lubricant fluid therein. As the journey signal 330 is generated in advance of a journey of the vehicle beginning, the transmission 160 may be heated, at least partially, whilst the vehicle is stationary i.e. in advance of the journey. In FIG. 3, the journey signal 330 may correspond to doors of the vehicle being unlocked and thus may remain active during at least part of the journey of the vehicle. In the method 200 of FIG. 2, the method returns to block 230 to again check the temperature of the transmission 160. Once the temperature of the transmission 160 reaches the temperature threshold 320, the heating of the transmission 160 may be discontinued. The heating may be discontinued by de-asserting the control signal 340 as in FIG. 3 at time t2. If the traction electric machine 150 is being used to deliver torque through the transmission 160 at this point, it will be appreciated that the temperature of the transmission 160 may be maintained or may continue to rise even absent the fluidic heating of the transmission 160, although not shown in FIG. 3. It will be appreciated that block 230 may be periodically performed during use of the vehicle i.e. whilst the vehicle is in motion or during the journey to ensure the temperature of the transmission 160 is maintained above the temperature threshold 320.

Figure 4:
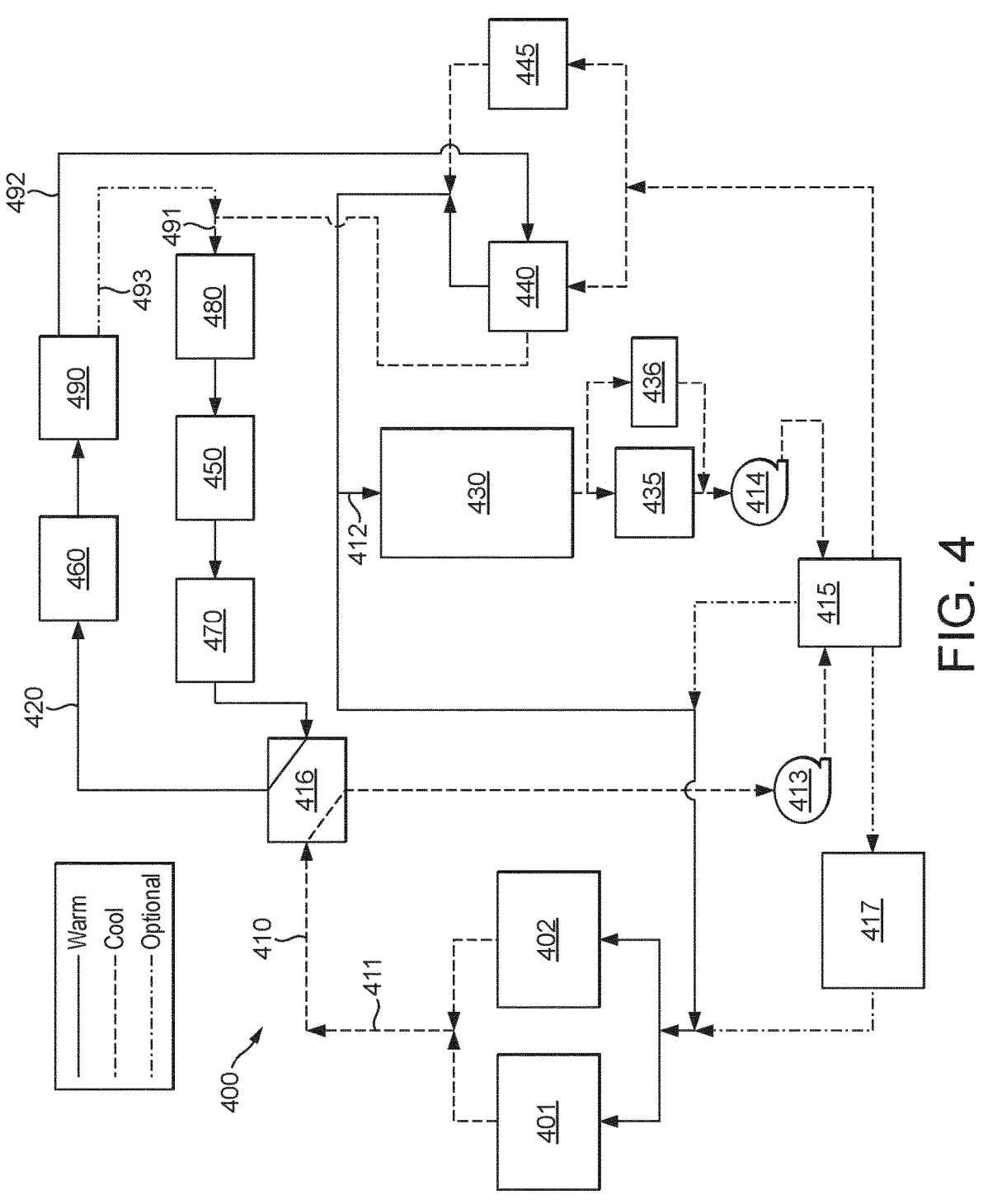
FIG. 4 shows an illustration of a coolant system of a vehicle according to an embodiment of the invention.

FIG. 4 is a diagram of a thermal management system 400 of a vehicle according to an embodiment of the invention. The thermal management system 400 of FIG. 4 is associated with a plurality of EDUs 401, 402, in particular first and second EDUs 401, 402 in the illustrated embodiment, each comprising a traction electric machine 150 associated with a transmission 160. Each EDU 401, 402 may provide torque to a respective wheel or axle of the vehicle. However it will be appreciated that the vehicle may comprise one, or more than two, EDUs.

The thermal management system 400 of FIG. 4 comprises a first fluidic or coolant circuit 410 and a second fluidic or coolant circuit 420. The first coolant circuit 410 is associated with the EDUs 401, 402. The second coolant circuit 420 is associated with a cabin of the vehicle. The first and second coolant circuits 410, 420 may exchange thermal energy via a heat exchanger 440 as will be explained. In FIG. 4 fluid conduits carrying warm coolant, cool coolant and fluid conduits which may not be used are indicated with dashing.

Figure 5:
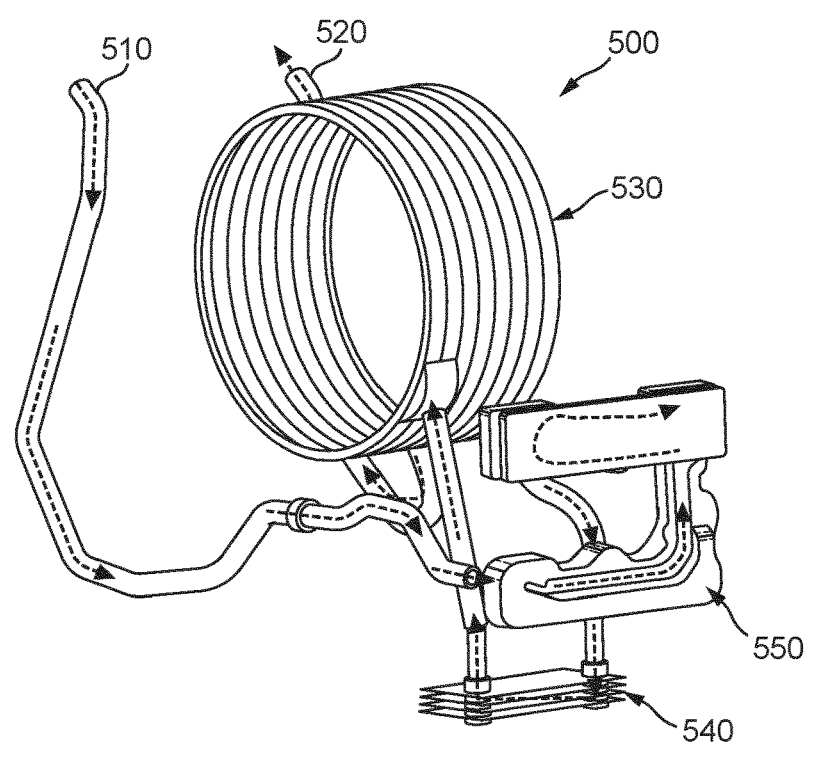
FIG. 5 shows a heat transfer apparatus according to an embodiment of the present invention.

The first coolant circuit 410 may also be associated with electrical module(s) of the EDUs 401, 402 such as an inverter of the traction electric machine 150 of each EDU 401, 402 as shown in FIG. 5. The first coolant circuit 410 is associated with the one or more EDUs 401, 402 and in the embodiment of FIG. 4 a traction battery 430 of the vehicle. Thus in some embodiments of the invention heating may be provided to the traction battery 430. The first coolant circuit 410 may also be associated with one or more electrical module(s) 435 of the vehicle associated with a HV electrical system of the vehicle, such as one or more of an on-board charger (OBC), DC-DC converter 435 etc. It will be understood that by associated, it is meant that the first coolant circuit 410 is thermally coupled or communicative to transfer thermal energy to/from the respective component to coolant flowing in the coolant circuit 410.

It will be appreciated from FIG. 4 that the first and second EDUs 401, 402 are present in a first branch 411 or loop of the first coolant circuit 410 in some embodiments, the traction battery 430 is present in a second branch 412 of the first coolant circuit 410. The first and second branches 411, 412 may be arranged in parallel configuration as in FIG. 4. Each of the first and second branches 411, 412 of the first coolant circuit 410 may comprise a respective pump 413, 414 for pumping coolant fluid there-through. In this way, coolant fluid may be selectively circulated through each of the first and second branches 411, 412 of the first coolant circuit 410 by the respective pump 413, 414. A control signal may be provided to each of the pumps 413, 414 for controlling the pump to circulate coolant fluid through the respective branch 411, 412. A valve 415 is present in the first coolant circuit 410 which selectively joins the first and second branches 411, 412. In particular, in some embodiments, the valve 415 has first and second inlet ports to receive coolant from each of the first and second branches 411, 412 and an outlet port to allow egress of coolant fluid from the valve 415 to return to the heat exchanger 440. In some embodiments, the valve 415 may be replaced by a three-way junction to receive coolant from the first and second branches 411, 412 and to output coolant fluid to the heat exchanger 440. In the embodiment shown in FIG. 4, the valve 415 comprises one or more selectively openable output ports, indicated as optional flows in FIG. 4, which allow coolant fluid to be directed to an inlet side of the EDUs 401, 420.

The first coolant circuit 410 comprises the heat exchanger 440. The heat exchanger 440 is a coolant-to-coolant to heat exchanger 440. The heat exchanger 440 is arranged to allow heat transfer between the first coolant circuit 410 and the second coolant circuit 420. The first coolant circuit 410 passes through a first side of the heat exchanger 440 and the second coolant circuit 420 passes through a second side of the heat exchanger 440, thereby enabling an exchange of thermal energy between the first and second coolant circuits 410, 420. As will be described, the heat exchanger 440 may be used to transfer heat from the second coolant circuit 420 to the first coolant circuit 410 to heat one or both of the traction battery 430 and the one or more EDUs 401, 402. The heat exchanger 440 is arranged in the first coolant circuit 410 to receive coolant fluid having passed through the one or more EDUs 401, 402 and/or the traction battery 430. The heat exchanger 440 is arranged to heat the coolant fluid in the first coolant circuit 410 for return to the one or more EDUs 401, 402 and/or the traction battery 430.

The first coolant circuit 410 may comprise a cooler or chiller 445. The chiller 445 may be arranged alongside i.e. in parallel with the heat exchanger 440. The chiller 440 is arranged to receive coolant fluid having passed through the one or more EDUs 401, 402 and/or the traction battery 430. The chiller 445 may act as a heat exchanger for a HVAC system of the vehicle, as will be explained with reference to FIG. 9.

The second coolant circuit 420 is, in some embodiments, a climate control coolant circuit associated with an occupant cabin of the vehicle. In some embodiments of the invention, heat is sourced from the second coolant circuit 420 to the first coolant circuit to heat one or both of one or more of the EDUs 401, 402 and the traction battery 430 of the vehicle. In particular, as discussed above, the heat is sourced from the second coolant circuit 420 to heat the transmission 160 of one or more EDUs 401, 402 of the vehicle to thereby improve an efficiency of the vehicle.

The second coolant circuit 420 comprises a heater 450 for heating the coolant within the second coolant circuit 420 and a pump 460 for circulating the coolant within the second coolant circuit 420. The heater 450 may be an electrically powered heater. Coolant within the second coolant circuit 420 is circulated between the heater 450 and the heat exchanger 440, such that thermal energy is provided by the heater 450 to the first coolant circuit 410. It will be appreciated that, in some embodiments, the heater 450 may directly heat coolant fluid within the first coolant circuit 410. The heater 450 may be a HV heater 450 of the vehicle.

The second coolant circuit 420 may comprise a heater core 470 for receiving coolant in the second coolant circuit 420 heated by the heater 450 and heating air in the occupant cabin of the vehicle, such as may be circulated through the heater core 470 by one or more fans. The second coolant circuit 420 may, in some embodiments, further comprise a condenser 480. The condenser 480 is associated with another fluid circuit, such as circuit 905 in FIG. 9, and is arranged to condense refrigerant within the other fluid circuit 905 to heat coolant fluid within the second coolant circuit 420. Thus the condenser 480 can heat the second coolant circuit 420 from the refrigerant in the other fluid circuit 905.

In some embodiments, the second coolant circuit 420 comprises a valve 490. The valve 490 is operable selectively to divert the flow of coolant within the second coolant circuit 420 between a return conduit 493, indicated as an optional flow in FIG. 4, for returning coolant having passed through the heater core 470 directly to the heater 450 and a flow path 492 to the heat exchanger 440. The valve 490 may be operable responsive to the control signal 145 discussed above, such that when the control signal 145 is indicative of heating of the transmission 160 the coolant flow in the second coolant circuit 420 is directed to flow via the heat exchanger 440. In this way, when heating of the transmission 160 is not required, coolant is not circulated through the heat exchanger 440 to thereby improve efficiency of cabin heating. Coolant fluid in the second coolant circuit 420 having passed through the heat exchanger 440 returns along fluid path 491 to be re-heated by the heater 450, in the embodiment shown via the condenser 480.

In some embodiments, the second coolant circuit 420 comprises a pump 460 for circulating coolant fluid. In some embodiments, the system 400 comprises a degas tank 416 which is present in one or both of the first and second coolant circuits 410, 420 to allow for degassing of the coolant fluid. The first coolant circuit 410 may comprise in some embodiments a radiator 417 for use as a low temperature radiator 417. Coolant may be directed to the radiator 417 by the valve 415.

It will be appreciated that through control of the valve 490 in the second coolant circuit 420 to direct coolant fluid to the heat exchanger 440, and particularly control of one or both of the pumps 413, 414 coolant fluid in the first coolant circuit 410 may be heated and used to heat one or both of the EDUs 401, 402 and traction battery 430. In particular, in some embodiments of the invention, heated coolant fluid may selectively or controllably be provided, i.e. at desired times, to the EDUs 401, 402. In particular, the transmission 160 may be heated from the coolant fluid to heat the lubricant fluid therein, which may reduce a viscosity of the lubricant fluid, to improve an efficiency of the EDU 401, 402.

FIG. 5 illustrates a heat transfer apparatus 500 according to an embodiment of the present invention. The heater transfer apparatus 500 may be used in the system of FIG. 4 associated with one or each EDU 401, 402. The heat transfer apparatus 500 may be used to thermally couple the first coolant circuit 410 with each EDU 401, 402. The heat transfer apparatus 500 may be used for heat transfer between coolant fluid and the transmission 160 associated with the traction electric machine 150. The embodiment of heat transfer apparatus 500 shown in FIG. 5 is arranged to circulate coolant fluid between the transmission 160 and the traction electric machine 150 of one or both of the EDUs 401, 402. In some embodiments, the heat transfer apparatus 500 is arranged to circulate coolant fluid to an electrical module of the EDU 401 such as the inverter. The heat transfer apparatus 500 may be comprised in the first coolant circuit 410 shown in FIG. 4.

The heat transfer apparatus 500 comprises an inlet 510 and an outlet 520 for receiving and outputting coolant fluid, respectively, flowing around the first coolant circuit 410. The apparatus 500 comprises an electric machine portion 530 for circulating coolant fluid in thermal communication with the traction electric machine 150 and a transmission portion 540 in thermal communication with the transmission 160. The electric machine portion 530 comprises a fluid jacket 530 for the electric machine 150 which circulates coolant around at least a portion of an exterior casing of the traction electric machine 150. In the embodiment shown the fluid jacket 530 is formed by a plurality of turns of conduit in cylindrical configuration for receiving the traction electric machine 150 there-between. The transmission portion 540 comprises a heat exchanger for exchanging thermal energy between the coolant flowing through the apparatus 500 around the first coolant circuit 410 and lubricant fluid within the transmission 160. In some embodiments, lubricant fluid within the transmission 160 is circulated through a portion of the heat exchanger 540 to efficiently exchange thermal energy with the coolant in the first coolant circuit 410. In some embodiments, as described below, the EDU 401, 402 comprises a pump circulating the lubricant fluid between the traction electric machine 150 and the transmission which is arranged to circulate the lubricant fluid through the heat exchanger 540. In some embodiments, the heat transfer apparatus 500 comprises an inverter portion 550 for thermally coupling to an inverter arranged to provide an electrical supply to the traction electric machine 150. As discussed above, in particular, the heat transfer apparatus 500 is useful for receiving heated coolant fluid to heat, in particular, the transmission 160 associated with the traction electric machine 150. Heating the transmission 160, and lubricant fluid therein, may improve an efficiency of torque generation by the traction electric machine 150 to thereby reduce energy consumption from the traction battery 430 of the vehicle.

Figure 6:
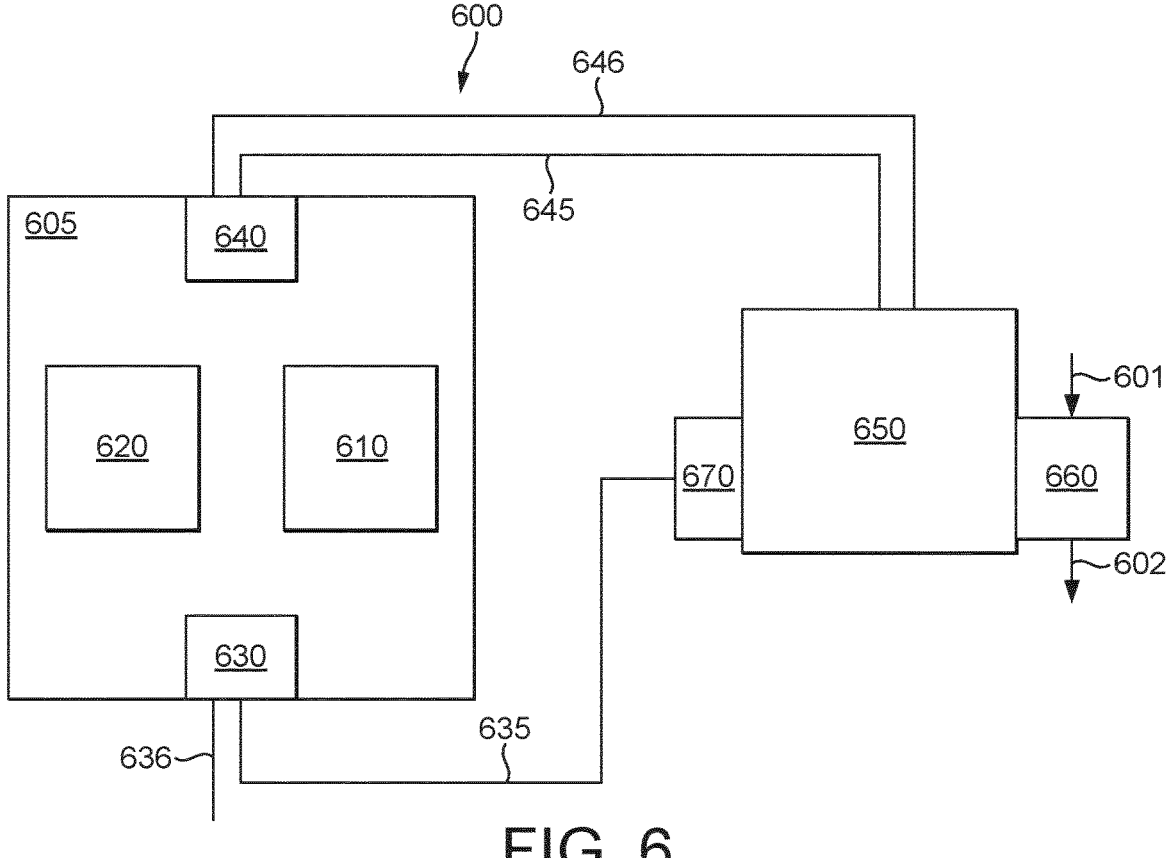
FIG. 6 shows a schematic illustration of a system according to another embodiment of the invention.

FIG. 6 illustrates a system 600 according to another embodiment of the invention which comprises a control system 605 according to another embodiment of the present invention. The system 600 may be used to assist controlling a temperature of a transmission associated with a traction electric machine of the vehicle. In particular, the system 600 may be useful to assist heating of the transmission 160, such as prior to a journey of the vehicle. However the system 600 may be useful to assist heating other components of modules of the vehicle, as will be explained.

The control system 605 may be formed by one or more electronic controllers 605. Each controller 605 may comprise a respective processing means 610, such as an electronic processing device 610 or computer processor. The processing device 610 is arranged to operably execute computer-readable instructions which may be stored in a memory means 620 formed by one or more memory devices 620 forming a memory 620 which communicatively coupled to the processing device 610. As in the embodiment described with reference to FIGS. 1*a* and 1*b*, the controller 605 comprises an input means 630 and an output means 640. The input means 630 may comprise an electrical input 630 of the controller 605. The output means 640 may comprise an electrical output 640 of the controller 605. The system of FIG. 6 is arranged to control a temperature of an electric drive unit (EDU) 650, such as described above, of a vehicle. The temperature of the EDU 650 is controlled by controlling a flow of lubricant fluid within the EDU 650, as will described. In some embodiments, the EDU 650 is controlled to act as a heat source. Advantageously a traction electric machine 150 of the EDU 650 may be used to assist in heating the transmission 160 of the EDU 650 by controlling the flow of lubricant fluid therein.

Figure 7:
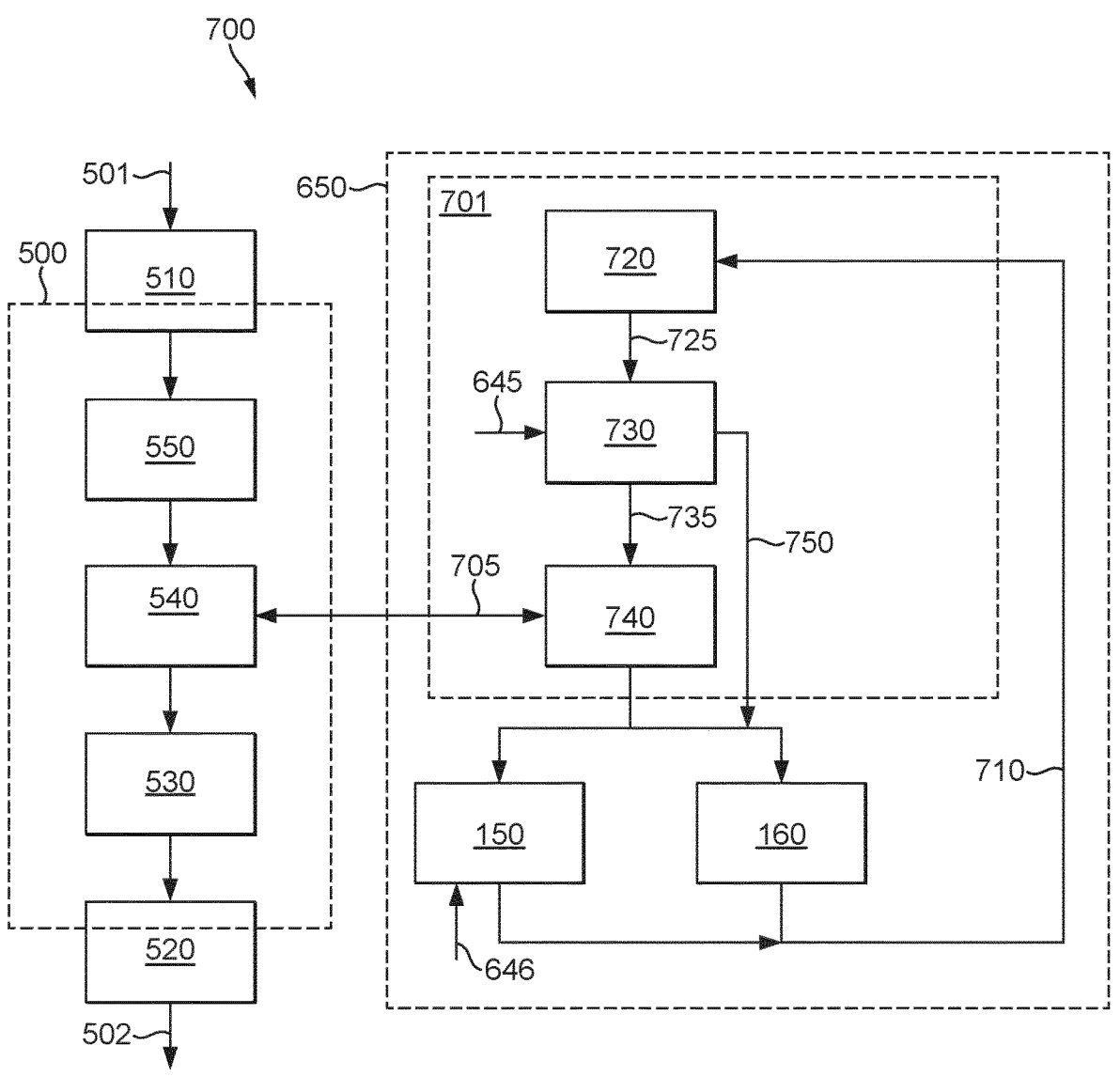
FIG. 7 schematically illustrates a flow of fluid in embodiments of the invention.

As in the system described above with reference to FIGS. 1*a* and 1*b* and shown in FIG. 7, the EDU 650 comprises an electric machine 150 operable as a traction electric machine 150 and a transmission 160 associated therewith for an electric vehicle. In use, the traction electric machine 150 provides torque to one or more wheels of the vehicle via the transmission. The transmission 160 provides at least one gear ratio between an output of the traction electric machine 150 and the one or more wheels of the vehicle. In some embodiments, the traction electric machine 150 and the transmission 160 may be integrated into a single housing to form the EDU 650 i.e. as an integral unit. The EDU 650 may be associated with a heat transfer apparatus 660, such as the heat transfer apparatus 500 illustrated in FIG. 5, for transferring thermal energy to/from EDU 650. The heat transfer apparatus 660 comprises a heat exchanger 530, 540 and 550 for transferring thermal energy between the EDU 650 and a received coolant fluid 601, such that coolant fluid 602 output from the heat transfer apparatus 660 has a different level of thermal energy, or temperature, than the received coolant fluid 510. That is, the coolant fluid may not necessarily cool the EDU 650 but may be used, at least at some points in time, to heat the EDU 650 as described above. Thermal energy may be transferred from one or more of the electric machine via fluid jacket 530, transmission from the transmission portion 540 such as from transmission lubricant fluid and the inverter 550 when the EDU 650 is operated as a heat source. In this way, heat may be selectively transferred away from the EDU 650 to heat other parts of the vehicle as will be explained.

Lubricant fluid is used with the EDU 650 to lubricate the transmission 160. The lubricant fluid may also be used to lubricate and/or cool the electric machine 150. In some embodiments, lubricant fluid within the EDU 650 is circulated via one or more of a rotor and stator windings of the traction electric machine 150. In this way, as well as from a casing of the traction electric machine 150, the lubricant fluid is heated by the traction electric machine 150.

One or more fluid communication paths are present within the EDU 650 between the traction electric machine 150 and the transmission 160, such that they may share the lubricant fluid i.e. lubricant fluid may be circulated there-between. That is, the lubricant fluid may be circulated between the traction electric machine 150 and the transmission 160 via the one or more fluid communication paths or conduits.

The input 630 of the controller 605 is arranged to receive a temperature signal 635 indicative of a temperature of the transmission of the EDU 650. In some embodiments, the temperature signal 635 may be derived from one or more measurements, particularly temperature measurements of components of the vehicle such as the traction electric machine or of a casing of the EDU 650. However in some embodiments, a temperature sensing means 670, such a temperature sensing device is 670, which may be a thermocouple or similar, is associated with the EDU 650 and may be arranged to measure a temperature of the transmission of the EDU 650. In some embodiments, the temperature sensing device 670 may be associated with a sump of the transmission or EDU 650 to measure a temperature of the lubricant fluid within the sump, although other arrangements may be envisaged. The temperature sensing device 670 operatively outputs the temperature signal 635 to the input 630 of the controller 605. The input may also be arranged to receive a journey signal 636 as described above.

The output 640 of the controller 605 is arranged to operably output one or more control signals 645, 646 under control of the processing device 110. The one or more control signals 645, 646 are for controlling the temperature of the EDU 650. In particular, in some embodiments of the invention, the one or more control signals 645, 646 comprises a flow control signal 645 for controlling a flow of lubricant fluid through the heat exchanger 660 associated with the EDU 650, as will be explained. The control of the flow of lubricant through the heat exchanger 660 may be used to assist in heating the transmission 160 of the EDU 650. The control of the flow of lubricant may alternatively or additionally be used to assist heating of other components of the vehicle 1300.

The one or more control signals 645, 646 may comprise a heat control signal 646 for causing the traction electric machine 150 to operate in a powerloss operating mode. In the powerloss operating mode, the traction electric machine 150 and its associated traction power electronics 155, such as the inverter, are arranged to generate excess heat. By excess it is meant more heat than necessary to generate traction torque. In other words, the traction electric machine 150 may be caused to operate inefficiently to generate additional heat by the heat control signal 646. Furthermore, in the powerloss mode, when the traction electric machine 150 is not required to produce traction torque, the traction electric machine 150 may generate heat for use in heating other components or modules of the vehicle. The heat may be used to heat the transmission 160 of the EDU 650. The heat may be used to heat other components of the vehicle. It will be appreciated that the electric machine 150 may receive other control signals, such as indicative of a torque demand.

FIG. 7 illustrates a thermal control system 700 according to another embodiment of the invention. The thermal control system 700 is for controlling the temperature of the EDU 650. The thermal control system 700 may, in use, assist in heating the transmission 160 of the EDU 650. The thermal control system 700 may be used to achieve heating of other components of the vehicle 1300 such as one or both of a cabin of the vehicle and a traction battery of the vehicle, although other components may be heated by the thermal control system 700.

The thermal control system 700 comprises the heat transfer apparatus 660 discussed above in relation to FIG. 6. The heat transfer apparatus 660 may be that described above with reference to FIG. 5 where like reference numerals indicate corresponding parts. The heat transfer apparatus 660 comprises the inlet 510, 601 and the outlet 520, 602 discussed above for receiving and outputting coolant fluid, respectively to allow coolant fluid to flow there-through. The heat transfer apparatus 660 is arranged to receive a flow of coolant fluid at the inlet 510 and to output coolant fluid from the outlet 520 which may have a different temperature than the received coolant fluid. Thus the coolant fluid may remove thermal energy from the EDU 650, which may be used to heat other components of the vehicle.

The heat transfer apparatus 660 comprises a heat exchanger, denoted by arrow 705 in FIG. 7, described above with reference to FIG. 6. The heat exchanger 705 comprises a coolant portion or circuit 540 for exchanging thermal energy between the coolant fluid circulated therethrough and a lubricant portion or circuit 740 of the heat exchanger 705 i.e. the two circuits 540, 640 together form the heat exchanger 705 for exchanging heat between the coolant fluid and the lubricant fluid in the of the EDU 650.

As described above in relation to FIG. 5 and shown in FIG. 6, in some embodiments the heat transfer apparatus 500, 660 comprises the electric machine portion 530 and the inverter portion 550. It will be noted that the order of the inverter portion 550, coolant portion 540 of the heat exchanger 545 and the electric machine portion 530 between the inlet 510 and outlet 502 may be different from that illustrated in FIG. 7 and is not restricted in this way. Thus the coolant fluid passing through the heat transfer apparatus 500, 660 may be heated, at least in part, via a casing of the traction electric machine 150 and an inverter associated with the traction electric machine 150.

The EDU 650, shown schematically in more detail in FIG. 7, comprises a lubricant module 701 having a lubricant pump 720 and a valve 730, and also including the lubricant circuit 740 of the heat exchanger 705. The lubricant module 701 is arranged to circulate lubricant fluid around the EDU 650, particularly between the traction electric machine 150 and the transmission 160 of the EDU 650. The valve 730 is arranged to control a flow of lubricant fluid within the EDU 650, and in particular a flow of lubricant fluid associated with the traction electric machine 150 and the transmission 160 through the heat exchanger 705.

In some embodiments, lubricant fluid is collected via a pickup 710 from within the EDU 650, such as from a sump thereof, and pumped by the pump 720 via a fluid path 725 to the valve 730. The valve 730 is arranged to control, in dependence on the control signal 645, hereinafter referred to as a valve control signal 645, whether the lubricant fluid is circulated to one or both of the traction electric machine 150 and the transmission 160 via the lubricant circuit 740 of the heat exchanger 660.

The valve 730, in a first configuration, directs lubricant fluid along a first path 735 through the lubricant circuit 740 of the heat exchanger 705. In a second configuration the valve 730 is arranged to direct the lubricant fluid via a second path or bypass fluid path 750 to omit circulation via the lubricant circuit 740 of heat exchanger 705. That is, in the second configuration the lubricant fluid is circulated by the pump 720 within the EDU 650 without passage via the heat exchanger 705. In this way, thermal loss of the lubricant fluid is reduced in the second configuration i.e. the lubricant fluid may heat faster, or retain heat, when not circulating via the heat exchanger 705. When the valve 730 is configured to direct the lubricant fluid via the first path through the lubricant circuit 740 of the heat exchanger 705, when the lubricant fluid is warm, the coolant fluid flowing through the other side of the heat exchanger 705 may be heated by the lubricant fluid, which is consequently reduced in temperature or cooled. The heated coolant fluid may be used to heat other components or modules of the vehicle 1300 as will be explained.

It will be appreciated that, in some embodiments, intermediate configurations of the valve 730 may be indicated by the valve control signal 645 wherein lubricant fluid is communicated in respective proportions via the first and second fluid paths 735, 750. For example, the valve control signal 645 may control the valve to partially direct fluid, for example 20% or 50% of the lubricant fluid pumped by the pump 720, to the second, bypass, fluid path 750. In the illustrated embodiment, lubricant fluid from the lubricant circuit of the heat exchanger 705 and the bypass fluid path 750 is circulated to one or both of the traction electric machine 150 and the transmission of the EDU 650. In this way, the temperature of the lubricant fluid may be controlled. When waste heat is available from the EDU 650 the valve control signal 645 may direct at least a part of the excess heat from the EDU 650 partially or completely through the first path 735 allowing lubricant fluid to circulate through the heat exchanger 705.

As noted above, the traction electric machine 150 may be controlled to generate heat, either without generating torque, or to generate additional heat i.e. additional to that which would normally be generated whilst the traction electric machine 150 generates torque. Such heat generation may be caused by appropriate control of one or more electrical currents within the traction electric machine 150.

Whilst the vehicle is stationary, without the traction electric machine 150 generating traction torque, the traction electric machine 150 may be controlled to generate excess or waste heat by only applying current to one or more selected windings of the traction electric machine 150. In some embodiments, only a d-axis stator current ($I_d$) of the traction electric machine 150 is energised to generate heat without also generating torque i.e. the rotor is not caused to rotate. The $I_d$ current may be a DC current applied to the stator windings. In other embodiments, an AC current is applied to $I_d$ or $I_q$ to create a rotating current vector independent of a position of a rotor of the traction electric machine 150.

When the traction electric machine 150 is being used to generate torque i.e. the rotor is rotating, one or more currents flowing within the traction electric machine 150 may be controlled to generate additional, waste, heat at least some of which is transferred to the lubricant fluid. This is achieved by increasing the scaled speed which represents the speed of the electric machine with respect to the Direct Current-Link voltage of the inverter. This results in a non-optimal current set point for the requested torque. This non-optimal current set point results in higher losses being produced by the electric machine and inverter for the same operating point for torque and speed.

The generation of heat, or additional heat, by the traction power electronics 155, such as the inverter, and traction electric machine 150 may be performed in dependence on the heat control signal 646. The heat control signal 646 may cause the traction inverter and traction electric machine 150 to operate in the powerloss mode as described above. Thus it can be appreciated that the traction inverter and traction electric machine 150 may be controlled by the heat control signal 646 to generate heat i.e. to convert electrical energy to thermal energy either whilst the vehicle is stationary (without also generating traction torque) or whilst the vehicle is in motion. The thermal energy from the traction inverter and traction electric machine 150 may be used to heat the transmission 160, particularly before a journey commences, or other modules of the vehicle.

Figure 8:
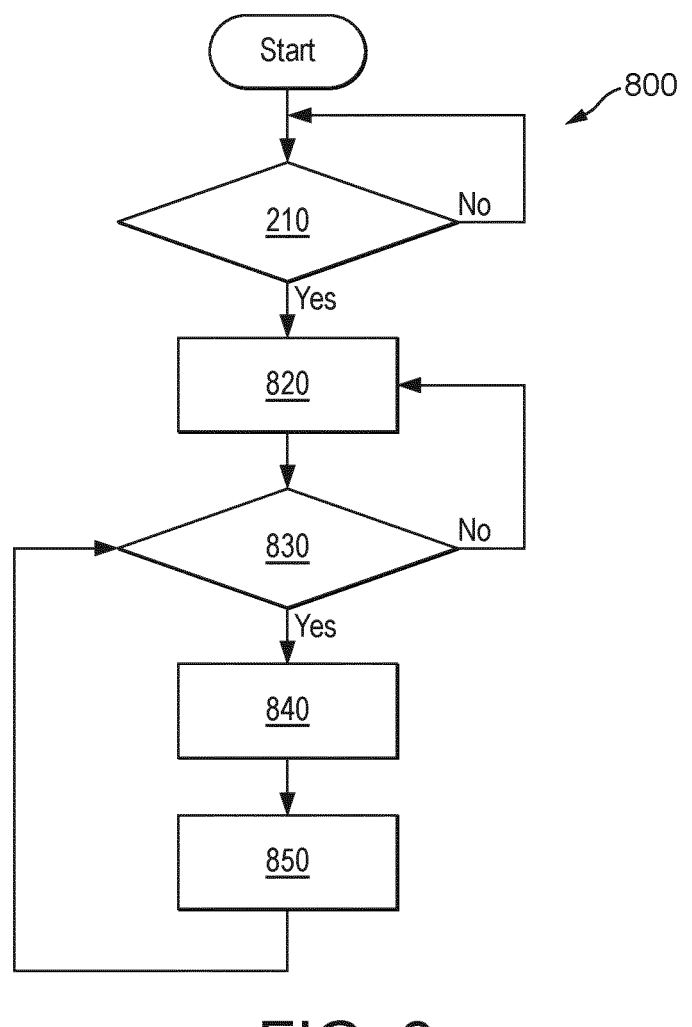
FIG. 8 illustrates a method according to an embodiment of the invention.

FIG. 8 illustrates a method 800 according to an embodiment of the invention. The method 800 is a method of controlling a temperature of the EDU 650. In particular, the method 800 is a method of heating a transmission 160 of a vehicle 1300. The transmission 160 may be heated prior to a journey of the vehicle commencing i.e. whilst the vehicle is stationary. The transmission may be heated by controlling a flow of lubricant between the traction electric machine 150 and the transmission 160 of the EDU 650.

The method 800 comprises a block 810 of determining whether a journey signal 636 indicative of a likelihood of a journey of the vehicle 1300 has been received. If the journey signal 636 hasn't been received, the method 800 loops back to block 810 i.e. doesn't progress until the journey signal 636 is received. Further information about the journey signal is provided above in relation to FIG. 2. If the journey signal 636 is received the method 800 moves to block 820.

The method comprises a block 820 of determining a temperature of the transmission 160 associated with the traction electric machine 150 of the vehicle. In particular, some embodiments of block 820 comprises receiving the temperature signal 635. The temperature signal 635 may be indicative of the temperature of a lubricating fluid within the EDU 650 or the transmission 160. The temperature signal 635 may be received at the input 130 of the controller 605 illustrated in FIG. 6 from the temperature sensing device 670 associated with the EDU 650.

The method 800 comprises a block 830 of determining whether the temperature indicated by the temperature signal 635 is less than a predetermined temperature threshold, such as the temperature threshold 320 illustrated in FIG. 2. If the temperature is less than the temperature threshold, the method 800 moves to block 840. If, however, the temperature of the transmission 160 is greater than or equal to the temperature threshold the method returns to block 820, or may end.

In block 840, the valve 730 of the EDU 650 is controlled to improve heating of the EDU 650, in particular the transmission 160 of the EDU 650 which may improve efficiency of the traction electric machine 150 providing motive torque for the vehicle. The valve 730 is controlled by the controller 605 outputting the valve control signal 645 to control a proportion of the flow of lubricant fluid within the EDU 650 through the heat exchanger 705 and the at least one bypass fluid path 750. In block 645, the valve control signal 645 is indicative of the valve 730 being configured to control a distribution of fluid between the first fluid path 735 i.e. via the lubricant circuit of the heat exchanger 705 and via the bypass fluid path 750 omitting the heat exchanger 750.

Flow of lubricant fluid via the heat exchanger 705 transfers thermal energy from the EDU 650 to the coolant fluid flowing through the coolant circuit 540 of the heat exchanger 705. In some embodiments, lubricant fluid flow through the bypass fluid path 750 may be used to achieve heating of the lubricant fluid by reducing thermal loss to the coolant fluid. The transfer of thermal energy to the coolant fluid i.e. away from the EDU 650 may be used to control the temperature of the EDU 650, in particular to prevent the temperature of the EDU 650 becoming too high. Furthermore, in some embodiments, the thermal energy transferred to coolant fluid i.e. to the first coolant fluid circuit 410 shown in FIG. 4 may be used to heat other parts of the vehicle, such as the traction battery 430 and or a cabin of the vehicle as will be described. That is, the EDU 650 may be used as a heat source. In such embodiments, the valve 730 may be used to control an amount of thermal energy transferred away from the EDU 650 i.e. to control the temperature of the EDU 650.

In block 850 the transmission 160 is heated. In particular, the lubricant fluid within the transmission 160 is heated. Block 240 in some embodiments comprises causing the traction inverter and traction electric machine 150 to generate heat for heating the transmission 160 of the EDU 650. As described above, in block 850 the controller 605 is arranged to output the heat control signal 646. As described above, the heat control signal 646 is arranged to cause the traction electric machine 150 to operate in the powerloss mode to generate heat, either whilst the vehicle is stationary i.e. without generating traction torque, or whilst the vehicle is in motion i.e. while the traction electric machine 150 generates traction torque. The heat generated by the traction inverter and traction electric machine 150 is communicated to the lubricant fluid within the EDU 650, such as by the coolant fluid of the traction inverter 550 and traction electric machine stator 540 being in thermal communication with the heat exchanger 705, as well as the transmission lubricant fluid being in direct thermal communication with windings and/or the rotor of the traction electric machine 150. It will also be appreciated that the transmission 160 may be heated by heated coolant fluid as in the embodiment described above.

In order to improve heating of the transmission 160, in block 850 the controller 605 is arranged to output the valve control signal 645 to control the flow of lubricant fluid to flow at least partly via the bypass fluid path 750. In this way, the lubricant fluid retains heat generated by the traction electric machine 150 within the EDU 650. Thus the flow of lubricant fluid within the EDU 650 may be increased in dependence on a temperature of the transmission 160 being lower, in particular the temperature being below the temperature threshold described above.

As in the embodiment illustrated in from FIG. 3, in dependence on the heating of the transmission, the temperature 310 of the transmission 160 begins to rise over time as thermal energy is communicated to the transmission 160, particularly to the lubricant fluid therein from the traction electric machine 150. As the journey signal 636 is generated in advance of a journey of the vehicle beginning, the transmission 160 may be heated, at least partially, whilst the vehicle 1300 is stationary. As described above, the journey signal 330 may be generated in dependence on doors of the vehicle being unlocked or an occupant of the vehicle being proximal to the vehicle. The journey signal 636 may remain active during at least a part of a journey of the vehicle. The temperature of the transmission 160 may be controlled during the journey of the vehicle 1300.

In the method 800 of FIG. 8, the method returns to block 830 to check the temperature of the transmission 160. Once the temperature of the transmission 160 reaches the temperature threshold, the heating may be discontinued i.e. the powerloss mode may be ceased. The valve 730 may be controlled to direct the flow of lubricant fluid via the first fluid path and the lubricant circuit 740 of the heat exchanger 705. Thus the temperature of the EDU 750 may be controlled i.e. maintained within a working temperature band above the temperature threshold.

Figure 9:
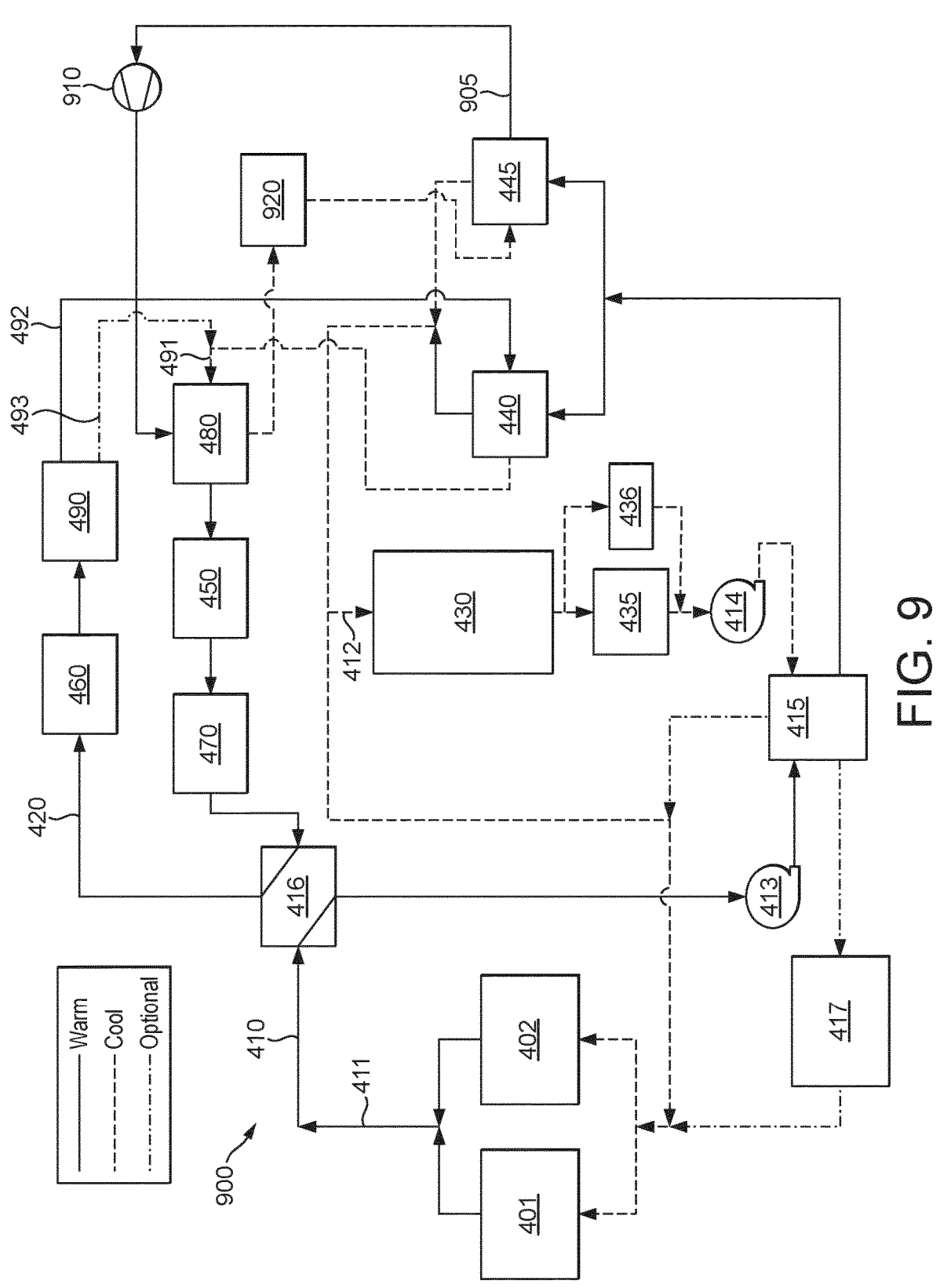
FIG. 9 shows an illustration of a coolant system of a vehicle according to another embodiment of the invention.

FIG. 9 is a diagram of a thermal management system 900 of a vehicle according to another embodiment of the invention. The system 900 comprises like components to the system 400 discussed above in relation to FIG. 4 and therefore, for clarity, discussion of components having like reference numerals will be omitted.

In addition, the system 900 of FIG. 9 comprises heat pump circuit 905 comprising a compressor 910. Refrigerant fluid is arranged to circulate around the heat pump circuit 905. The refrigerant passes through the chiller 445 which acts as a heat exchanger with the first coolant circuit 410 having coolant fluid circulating through in thermal communication with the EDU 650 i.e. via the heat exchanger 660. The refrigerant may be a multiphase or single phase fluid.

The compressor 910 is arranged to receive refrigerant from the chiller 445. The compressor 910 may receive the refrigerant in the form of a chilled gas from the chiller 445. The compressor 910 compresses the refrigerant and provides the compressed refrigerant the condenser 480. The condenser 480 is arranged to heat the coolant fluid in the second coolant circuit 420 prior to the heater 450. In this way, heat is provided to the second coolant circuit 420 for heating the occupant cabin of the vehicle 1300 from the heat pump circuit 905. The condenser 480 condenses the gas from the compressor 910, which may cause the gas to return to a liquid state of the refrigerant. The compressor 910 is thus arranged to change or upgrade a grade of heat of the refrigerant in the heat pump circuit 905, as will be explained further below. That is, the compressor 910 is operative to increase exergy of the fluid in the heat pump circuit 905.

In some embodiments, the system 900 comprises a receiver-drier (R/D) 920. As will be appreciated, the R/D 920 may retain moisture and contaminants in fluid circulated therethrough and assist in condensation of the refrigerant in circuit 905. In some embodiments, the refrigerant circuit 905 may comprise pump for pumping fluid therethrough.

Therefore it can be appreciated that the coolant flowing in the first coolant circuit 410 is in thermal communication via heat exchanger (chiller) 445 with the refrigerant circuit 905 including compressor 910. The heat exchanger thus acts as a heat source to the refrigerant circuit 905. Thus the grade of heat may be controlled via refrigerant circuit 905.

In this way, coolant in the first coolant circuit 410 heated via the EDU 660 may be caused to heat the coolant flowing in the second coolant circuit 420 for heating the occupant cabin of the vehicle 1300.

Figure 10:
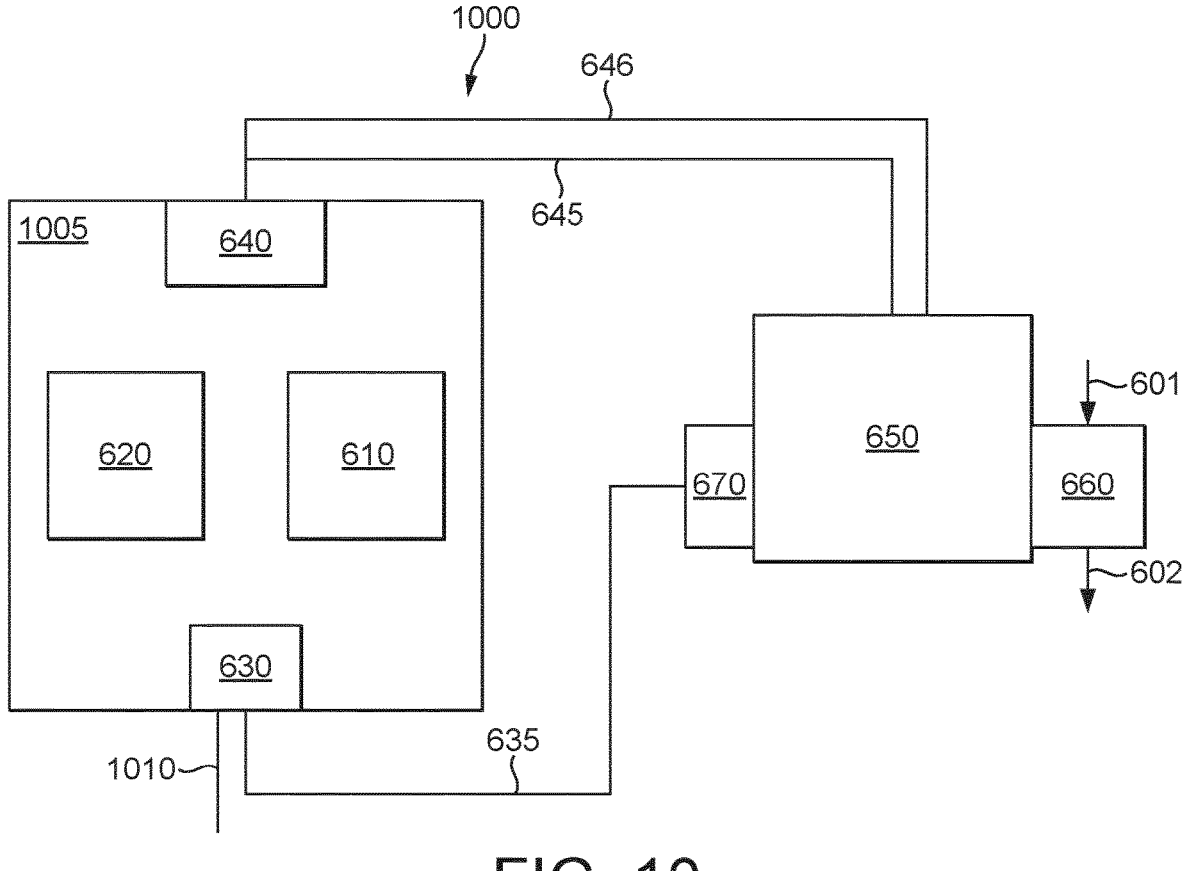
FIG. 10 shows a schematic illustration of a system according to a further embodiment of the invention.

FIG. 10 illustrates a system 1000 which comprises a control system 1005 according to another embodiment of the present invention. Like reference numerals to the system 600 illustrated in FIG. 6 have been used where appropriate for clarity. The reader is directed to the description above associated with FIG. 6 for description of like-numbered components. The system 1000 may be used to assist controlling a temperature of one or more components or modules of the vehicle 1300. In particular, the system 1000 may be useful to assist heating of one or more components or modules of the vehicle 1300, such as prior to a journey of the vehicle. The one or more components or modules of the vehicle 1300 may be those external to the EDU 650 and heat transfer apparatus 660. The one or more components or modules of the vehicle 1300 may comprise a traction battery of the vehicle 1300 or an occupant compartment or cabin of the vehicle 1300, with it will being appreciated that embodiments of the invention may be used to heat other components or modules.

The system 1000 shown in FIG. 10 comprises a controller 1005 having an input means 630 which, as described above, may comprise an electrical input 630 of the controller 1005. The input 630 is arranged to receive a heat request signal 1010 indicative of a request for heating of the one or more components or modules of the vehicle 1300. The input 630 also receives the temperature signal 635 indicative of the temperature of the transmission 160 of the EDU 650 as described above. Although the controller 1005 is not shown as receiving the journey signal 636 described above, it will be understood that this is merely for ease of representation and that the controller 1005 may perform one or more steps or processes in dependence on the journey signal 636.

The controller 1005 has an output means 640 which, as described above, may comprise an electrical output 640 of the controller 1005. The output 640 is arranged to output a control signal 1020 for causing a heat exchanger 660 associated with one or both of the traction inverter and traction electric machine 150 and the transmission 160 of the EDU 650 to output heat for the one or more modules of the vehicle 1300. As will be explained, in some embodiments, the control signal 1020 is a flow control signal 1020 for controlling a flow control means to control a flow of lubricant fluid associated with the traction electric machine 150 and the transmission 160 through the heat exchanger 660, such that the heat exchanger 660 outputs heat for the one or more modules of the vehicle 1300. The flow control means may be the valve 730 of the EDU 650 discussed above.

The controller 1005 is arranged to perform a method 1100, 1200 according to an embodiment of the invention such as illustrated in one or both of FIGS. 11 and 12 as will be described. In embodiments of the invention, the controller 1005 is arranged to compare a heating power of the EDU 650 and electric heating power to determine whether heating for the one or more modules of the vehicle is to be provided from the EDU 650 or from an electric powered source of heating i.e. which may consume electrical power from one or more batteries of the vehicle. The determination of whether heating is to be provided from the EDU 650 may comprise a determination of whether sufficient heat is available from the EDU 650. In some embodiments, as will be explained, the determination comprises determining a relative expense or cost of providing the heat from the EDU 650 or from the electrical source of heating. The cost of providing the heat from the EDU 650 may comprise consideration of additional electrical power consumption from the traction electric machine 150 of the EDU 660 as the temperature of the EDU 660, and particularly lubricant fluid in the transmission 160, is reduced consequent to providing the heat from the EDU 650.

Figure 11:
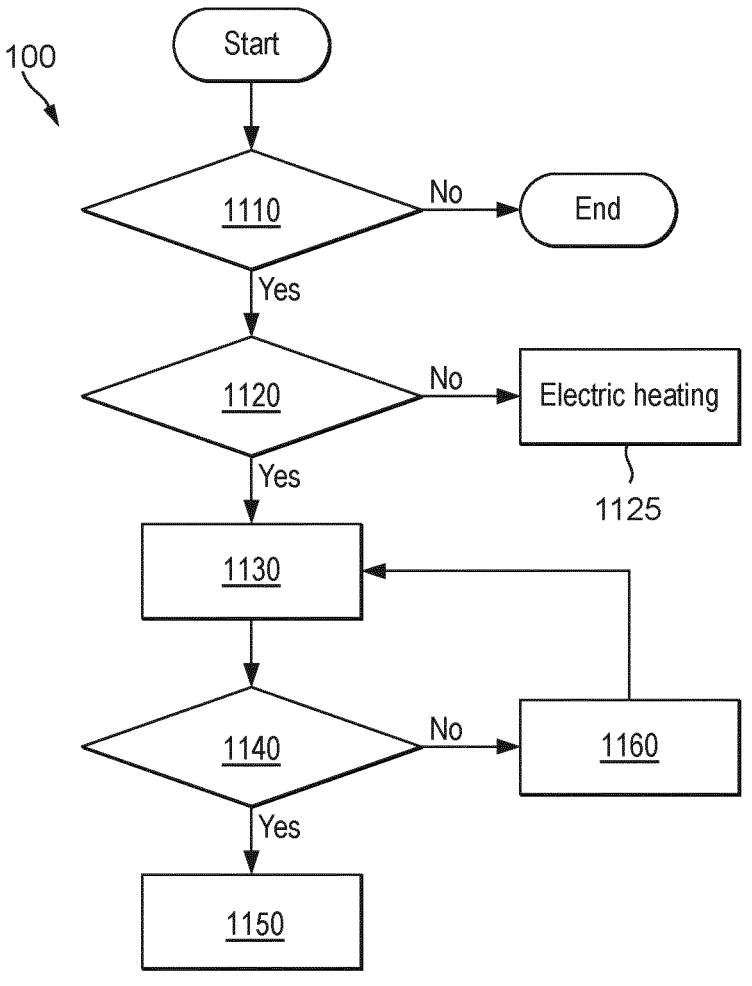
FIG. 11 shows a method according to a further embodiment of the invention.
Figure 12:
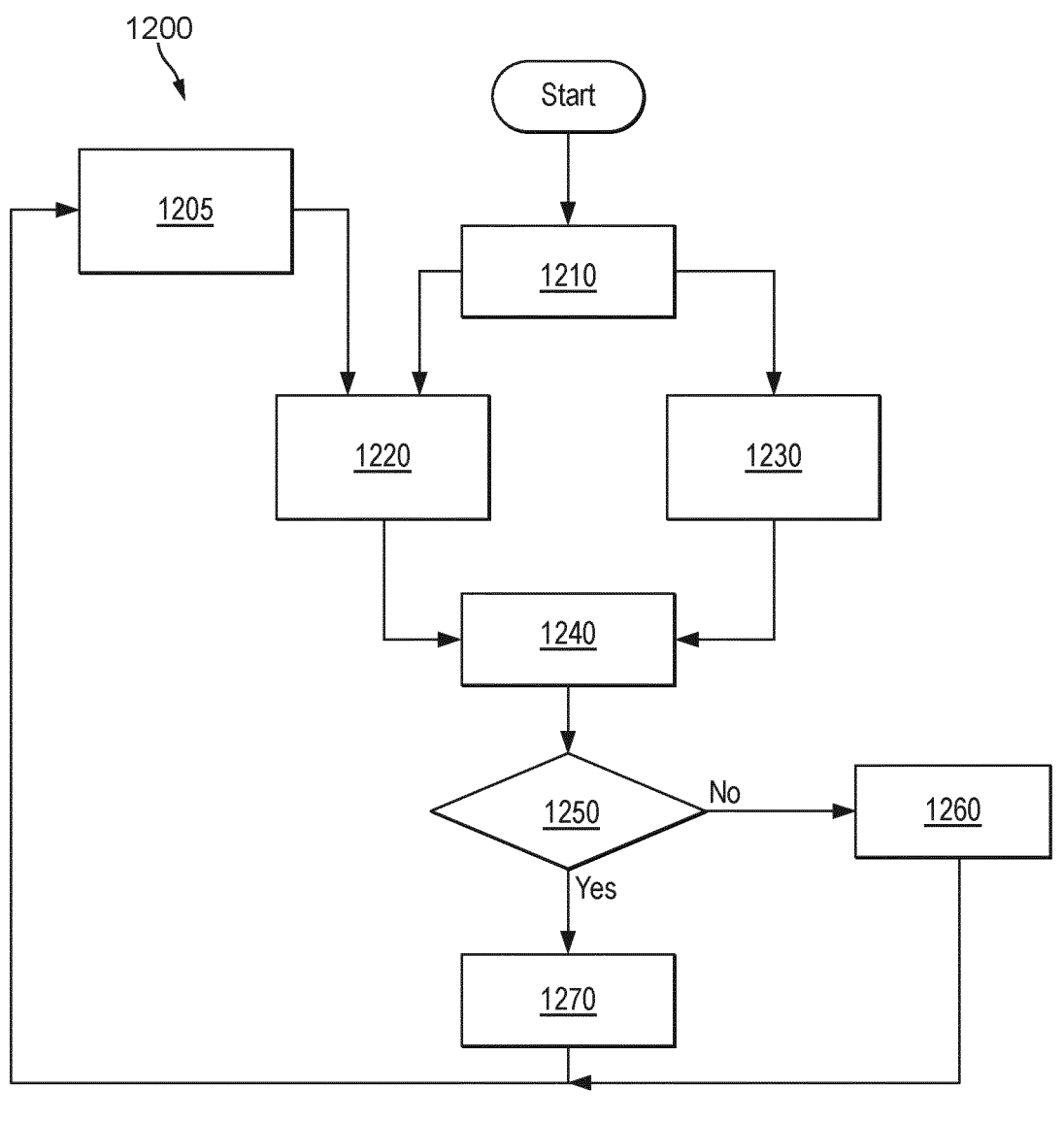
FIG. 12 shows a method according to a still further embodiment of the invention.

The methods 1100, 1200 illustrated in FIGS. 11 and 12 form a method of determining whether to use heat from the EDU 650 or electrical heating for one or more modules of the vehicle. The method 1200 illustrated in FIG. 12 may be performed in some embodiments of block 1120 of the method 1100 illustrated in FIG. 11. The methods 1100, 1220 may be computer-implemented such as by the controller 1005 of the control system 1000 illustrated in FIG. 10.

Referring to FIG. 11, block or step 1110 comprises determining whether a heat request signal 1010 is received. The heat request signal 1010 may be received at the input 630 of the controller 1005. The heat request signal 1020 is indicative of a request for heating of one or more modules of the vehicle. The heat request signal 1010 may be provided, for example, from a controller associated with the traction battery 430 of the vehicle 1300 in dependence on a determination of a temperature of the traction battery 430. For example, determining that the temperature of the traction battery 430 is below a temperature threshold. The heat request signal 1010 may be provided from a controller associated with a heating system of the vehicle 1300, such as an occupant cabin heating system, such as in HVAC system of the vehicle 1300. The request 1010 may be provided from the controller in dependence on a user input or a determination that a temperature of the occupant cabin is below a threshold which may have been set by an occupant of the vehicle 1300. Other sources of the heat request signal 1010 may be envisaged.

In step 1110 if the heat request signal 1010 is not received, the method 1100 may end or, alternatively, the method loops or pauses at step 1110 until the heat request signal 1110 is received. When the heat request signal is received the method 1100 moves to block 1120.

Block 1120 of the method 1100 comprises determining whether heat is available 1120 from the EDU 650 for the heat request i.e. to provide heat to the one or more modules of the vehicle 1300. The heat available from the EDU 650 may be excess or waste heat generated by the traction electric machine 150 providing traction torque via the transmission 160. Alternatively the waste heat may be from the traction electric machine 150 operating in the powerloss mode whilst operating traction torque. In block 1120, if it is determined that heat is not available from the EDU 650, the method moves to block 1125 where heat for the one or more modules of the vehicle, such as the traction battery 430 or occupant cabin of the vehicle 1300 is provided from an electric-powered heat source. The electric-powered heat source may comprise direct electric heating i.e. wherein heat is generated direct from the electric source such as via one or more heating elements to convert electricity to heat.

The method 1200 illustrated in FIG. 12 may be performed in some embodiments of step 1120 to determine whether heat is available 1120 from the EDU 650.

Referring to FIG. 12, the method 1200 comprises a block 1205 of determining a temperature of at least a portion of the EDU 650. The determination in block 1205 may be determining a temperature T of the transmission 160 of the EDU 650. Block 1205 may comprise receiving the temperature signal 635 indicative of the temperature of the transmission 160. In the method 1200, a transmission heating power is determined in dependence on the temperature T of the transmission 160.

The method 1200 comprises a block 1210 of determining a power demand from the EDU. The power demand from the EDU 650 is the power requested from the EDU 650 at a current point in time. The power demand from the EDU 650 may be an amount of power the EDU 650 is being requested to deliver or produce. The power demand may be indicative of an amount of power provided by an inverter associated with the traction electric machine 150 at the current point in time for providing traction torque for the vehicle 1300. The power may be determined based on an electrical current and voltage output by the invertor.

In block 1220 a powerloss of the EDU 650 is determined. The powerloss is a powerloss of the EDU 650 at the temperature T and the current point in time. The powerloss is the power lost by the EDU 650 due to inefficiency at the temperature T. In particular, the powerloss of the EDU 650 results particularly from the powerloss of the transmission 160 of the EDU 650 at the temperature T. The powerloss of the transmission 160 may arise particularly from the lubricant fluid within the transmission 160. Thus in block 1220 a current power loss of the transmission 160 is determined in dependence on the temperature signal 635 indicative of the temperature T.

In block 1230 a minimum powerloss of the EDU 650 is determined. The minimum powerloss is a minimum powerloss of the transmission 160 of the EDU 650 in some embodiments. The minimum powerloss is a minimum possible powerloss of the EDU 650. The minimum possible powerloss is a minimum power lost by the EDU 650 e.g. at an optimum or maximally efficient operating temperature.

The minimum power loss may be determined according to f ($\eta$, T) where $\eta$ is a function, n is indicative of efficiency of the EDU 650 at the temperature T. The efficiency of the EDU 650 is a function of the efficiency of components thereof, such as the traction inverter, traction electric machine 150, transmission 160 components thereof such as pumps etc.

In block 1240 a value is determined indicative of an amount of power available from the EDU 650 for heating the one or more modules of the vehicle 1300. The value may be referred to as $\Delta$powerloss according to $\Delta$powerloss=powerloss−min_powerloss where powerloss is that determined in block 1220 and min_powerloss is that determined in block 1230. The $\Delta$powerloss is referred to as Phi3 in block 1250 i.e. $\Delta$powerloss=Phi3. Thus Phi3 represents the transmission heating power i.e. an amount of power available from the EDU 650 for heating.

In block 1250 a comparison is made between the transmission heating power and electric heating power required for the request for heating the one or more modules of the vehicle 1300. The electrical heating power may comprise one or both of direct electrical heating power and indirect electrical heating power, such as required to power a heat pump heating system of the vehicle 1300.

In block 1250 Phi1 represents electrical power required for direct electrical heating i.e. using one or more heating elements for directly converting electrical power to heat. The one or more heating elements may be associated with the traction battery 430 or may be part of a HV coolant heater of the vehicle, for example. In some embodiments, the conversion of electrical power to heat may be assumed to performed at a 1:1 ratio, where 1 KW of electrical energy produces 1 KW of heat energy for simplicity although other conversion factors may be used. Thus electrical power may be considered to be Phi1=$\Delta$Power$_{Elec1}$ where=$\Delta$Power$_{Elec1}$ is electrical power for direct heating.

In some embodiments Phi2 may represent electrical power required to increase or upgrade a grade of heat available, as will be explained, for example using a heat pump. In some embodiments, the electrical power taken to upgrade the grade of heat available may be a predetermined ratio which may be greater than 2:1 such as 3:1 or 5:1 for example where 1 KW of electrical energy produces 2 KW, 3 or 5 KW of heat energy. Thus Phi2=$\Delta$Power$_{Elec2}$ where=$\Delta$Power$_{Elec2}$ is electrical power for indirect heating i.e. using a heat pump.

In block 1250 it is determined whether the power from the EDU 650 is less than the electrical heating power. In other words, whether the cost of providing the heat from the EDU 650 is less than the cost of providing the heat from an electrical source, which may comprise either direct or indirect electrical heating. It will be appreciated that utilising heat from the EDU 650 may reduce an efficiency of the EDU 650 and therefore the EDU 650 consumes more power to provide traction torque for the vehicle 1300. Thus in some embodiments of step 1250 it is determined whether Ph1 or Phi2 is greater than Phi3 i.e. whether it is less costly, in terms of electrical energy consumed, to provide heat from the EDU 650. If Phi3 is less than Phi1 or Phi2 then the method 120 moves to block 1270 where heat is provided from the EDU 650. If, however, Phi3 is greater than Phi1 or Phi2 then the method moves to block 1260 where heat provided from the EDU 650 is reduced, or maintained at zero if no heat is currently being provided from the EDU 650 for heating other modules of the vehicle 1300.

In block 1270 heat output from the heat exchanger 660 is increased. The heat output from the heat exchanger 660 is increased consequent on the comparison indicating the transmission heating power being less than the electrical heating power i.e. that less electrical power is required to use heat from the EDU 650 than to produce heat either directly or indirectly.

Block 1270 may comprise the controller 1005 outputting the control signal 1020 to increase the heat output. In some embodiments, where the control signal 1020 is a flow control signal 1020, the flow control signal 1020 is arranged to control the valve 730 to direct an increased flow of lubricant fluid through one or more channels of the lubricant circuit 740, such that the lubricant fluid is directed through the heat exchanger 705, as illustrated in FIG. 7, to output heat for heating the one or more modules of the vehicle 1300. In some embodiments, the control of the valve 730 may comprise opening the valve 730, although it will be appreciated this depends on the arrangement of valve 730 and conduits within the EDU 650.

In block 1260 heat output from the heat exchanger 660 is reduced. The heat output from the heat exchanger 660 is reduced consequent on the comparison indicating the electrical heating power being less than the transmission heating power i.e. that less electrical power is required to produce heat either directly or indirectly, rather than using heat from the EDU 650. Block 1260 may comprise the controller outputting the control signal 1020 to reduce the heat output. In some embodiments, where the control signal 1020 is a flow control signal 1020, the flow control signal is arranged to control the valve 730 to direct an increased flow of lubricant fluid through one or more channels of the bypass fluid path 750, such that the lubricant fluid bypasses the heat exchanger 705 as illustrated in FIG. 7.

In one or both of blocks 1260 and 1270, the control of heat output may be performed in a stepwise manner. In some embodiments, the controller 1005 is arranged to control the output means 640 to output the control signal 1020 in a stepwise manner. The stepwise manner comprises increasing or decreasing the output in steps less than a maximum change in heat output. In some embodiments, blocks 1260, 1270 comprise changing a position of the valve 730, i.e. opening or closing the valve 730, by a predetermined amount or percentage of maximum control of the valve 730. For example, the predetermined percentage may be 5 or 10% i.e. the valve may change position in block 1270 by 10% to increase output in the stepwise manner.

Following a change in heat output in block 1260 or 1270, the method 1200 may repeat from block 1250 to determine the transmission 160 heating power in dependence on a change in temperature of the transmission 160. Since providing heat from the EDU 650 reduces a temperature of the EDU 650, or the temperature of the EDU may rise, after blocks 1260, 1270 the method 1200 may return to block 1205 to determine a current temperature of the EDU 650.

In some embodiments, block 1270 may comprise controlling a pump to circulate the flow of lubricant fluid through one or both of the transmission 160 and the traction electric machine 150 output heat for the one or more modules of the vehicle via the heat exchanger 660.

Returning to FIG. 11, block 1130 comprises determining a grade of heat (GoH) or exergy of the available heat, such as from the EDU 650. As will be appreciated, exergy is indicative of an amount of useful heat energy available. The determination of the GoH or exergy may be made in dependence on a temperature of the heat available from the EDU 650, such as a temperature of coolant fluid heated after passing through the heat exchanger associated with the EDU 650. The exergy may be calculated as $Ex=S(T-T_0)$ where S is entropy as a function of a temperature of heat energy T and $T_0$ is ambient temperature. If, for example, it was determined in the method 1200 at $t_1$ that 5 KW of heat energy is available i.e. 5000 J/s at a temperature of 25° C. when ambient temperature is 0° C. (273 k), the GoH is calculated as (298−273)/5000=0.005, whereas at $t_2$ 5 KW of heat energy is available i.e. 5000 J/s at a temperature of 40° C. then GoH=0.008.

In block 1140 it is determined whether the GoH is adequate to provide heating to the one or more modules of the vehicle. The determination in block 1140 may be made by comparing the GoH determined in step 1140 with a threshold. The threshold may be selected according to the module of the vehicle to which heat is to be supplied. For example, a threshold associated with the traction battery 430 may be different than a threshold associated with the HVAC system of the vehicle 1300. If the GoH is not adequate i.e. is less than the threshold, the method 1100 moves to block 1160. In block 1160 the GoH of the available heat may be increased, such as by compressing heated refrigerant having passed through the heat exchanger 660. The compression may be provided by the compressor 910 of the heat pump circuit 905 described above. Steps 1130-110 are repeated in the method 1100 until the GoH is adequate i.e. at least the threshold in step 1140, wherein the method 1100 moves to step 1150. In step 1150 the available heat is used to heat the one or more modules of the vehicle to at least partly satisfy the heat demand requested in step 1110.

As noted above, the one or more modules of the vehicle may comprise the traction battery 430 of the vehicle 1300. The traction battery 430 may be heated by the coolant fluid flowing through the branch 412 of the first coolant circuit 410. The occupant cabin of the vehicle 1300 may be heated by heating coolant fluid flowing through the second coolant circuit 420 as described above.

FIG. 13 illustrates a vehicle 1300 according to an embodiment of the invention. The vehicle 1300 may be an electric vehicle. The vehicle 1300 may comprise an apparatus or system according to an embodiment of the invention such as a system may be arranged to perform a method according to an embodiment of the invention such as illustrated in any of FIGS. 2, 8, 11 and 12.

It will be appreciated that various changes and modifications can be made to the present invention without departing from the scope of the present application.

The invention claimed is:

1. A control system comprising one or more controllers, the control system comprising:

an input arranged to receive a temperature signal indicative of a temperature of a transmission associated with a traction electric machine of a vehicle, the input means arranged to receive a journey signal indicative of a journey of the vehicle commencing;

an output arranged to operably output a control signal for causing a fluidic communication of thermal energy from a first fluid in thermal communication with a heat source to a second fluid in thermal communication with a transmission heat exchanger for heating the transmission, the first fluid and the second fluid being different fluids and exchanging thermal energy in the transmission heat exchanger; and an electronic processing device arranged to control the output to output the control signal in dependence on the temperature signal and in dependence on the journey signal to cause heating of the transmission prior to the journey of the vehicle commencing.

2. The control system according to claim 1, wherein the electronic processing device is arranged to control the output in dependence on a temperature threshold.

3. The control system according to claim 2, wherein the electronic processing device is arranged to compare the temperature signal and the temperature threshold to determine whether to control the output means to output the control signal to cause heating of the transmission.

4. The control system according to claim 1, wherein:
the input is arranged to receive a journey signal indicative of a likelihood of a journey of the vehicle commencing; and
the electronic processing device is arranged to control the output to output the control signal in dependence on the journey signal to cause heating the transmission prior to the journey of the vehicle commencing.

5. The control system according to claim 1, wherein the control signal is arranged to control one or more pumps and/or valves to circulate heated fluid via the transmission heat exchanger.

6. The control system according to claim 1, wherein the control signal is arranged to control one or more pumps and/or valves to circulate heated fluid via a traction battery of the vehicle.

7. A system, comprising:
a control system according to claim 1;
a temperature sensing device arranged to output the temperature signal to the control system, the temperature signal being indicative of a temperature of at least a portion of a transmission associated with a traction electric machine of a vehicle; and
a pump and/or valve arranged to receive a control signal output by the control system, wherein the pump and/or valve is arranged to control fluid communication of thermal energy from a heat source to a transmission heat exchanger for heating the transmission.

8. The system of claim 7, wherein the pump and/or valve comprises a pump arranged to circulate heated fluid via the transmission heat exchanger.

9. The system of claim 8, wherein the pump and/or valve comprises a valve arranged to direct the heated fluid via the transmission heat exchanger.

10. The system of claim 7 wherein the temperature sensing device is thermally coupled with the transmission.

11. A vehicle comprising the system according to claim 7.

12. A vehicle comprising the control system according to claim 1.

13. A system for an electric vehicle, comprising:
a fluid communication system for fluidicly communicating thermal energy from a first fluid in thermal communication with a heat source to a second fluid in thermal communication with a transmission heat exchanger for heating a transmission associated with a traction inverter and traction electric machine of the vehicle, the first fluid and the second fluid being different fluids;
temperature sensing device arranged for outputting a temperature signal indicative of a temperature of at least a portion of the transmission; and
a control system comprising an input arranged to receive the temperature signal and a journey signal indicative of a journey of the vehicle commencing, an output arranged to operably output a control signal for causing circulation of the first fluid in the fluid communication system to conduct a thermal heat exchange with the second fluid in the transmission heat exchanger, wherein the control system is arranged to output the control signal in dependence on the temperature signal and in dependence on the journey signal.

14. The system of claim 13, wherein the fluid communication system is arranged to fluidicly communicate thermal energy from the heat source to a traction battery of the electric vehicle.

15. The system of claim 13, wherein the heat source comprises one or more of an electrical heater or a heat pump.

16. A method, comprising:
determining a temperature of a transmission associated with a traction electric machine of a vehicle; and
causing fluidic communication of thermal energy from a first fluid in thermal communication with a heat source to a second fluid in thermal communication with a transmission heat exchanger for heating the transmission in dependence on the temperature of the transmission,
wherein the first fluid and the second fluid are different fluids.

17. A non-transitory computer readable medium storing software which, when executed by an electronic processing device, is arranged to cause the electronic processing device to perform a method according to claim 16.

18. A vehicle comprising the system according to claim 13.

* * * * *